United States Patent
Tamekuni et al.

(10) Patent No.: US 8,047,726 B2
(45) Date of Patent: Nov. 1, 2011

(54) OPTICAL CONNECTOR

(75) Inventors: Yoshikyo Tamekuni, Kanagawa (JP); Yukihiro Yokomachi, Kanagawa (JP); Tsutomu Watanabe, Kanagawa (JP); Toshihiko Honma, Kanagawa (JP); Masahiro Shibata, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 999 days.

(21) Appl. No.: 11/984,088

(22) Filed: Nov. 13, 2007

(65) Prior Publication Data

US 2010/0284653 A1    Nov. 11, 2010

(30) Foreign Application Priority Data

Nov. 13, 2006 (JP) ............... P.2006-307138
Jan. 15, 2007 (JP) ............... P.2007-006251

(51) Int. Cl.
G02B 6/38 (2006.01)

(52) U.S. Cl. ........... 385/60; 385/53; 385/69; 385/95; 385/96; 385/97; 385/98

(58) Field of Classification Search ........... 385/53, 385/56, 58, 60, 66, 69, 72, 95, 96, 97, 98, 385/99
See application file for complete search history.

(56) References Cited

U.S. PATENT DOCUMENTS

| | | | |
|---|---|---|---|
| 4,404,010 A * | 9/1983 | Bricheno et al. | 65/407 |
| 5,963,692 A * | 10/1999 | Marazzi et al. | 385/80 |
| 6,120,193 A * | 9/2000 | Luther et al. | 385/99 |
| 6,715,933 B1 | 4/2004 | Zimmer et al. | |
| 7,329,049 B2 * | 2/2008 | Meek et al. | 385/55 |
| 7,815,377 B2 * | 10/2010 | Doss et al. | 385/98 |
| 7,934,874 B2 * | 5/2011 | Honma et al. | 385/97 |
| 2009/0238523 A1 * | 9/2009 | Honma et al. | 385/96 |
| 2010/0284653 A1 * | 11/2010 | Tamekuni et al. | 385/60 |

FOREIGN PATENT DOCUMENTS

| | | |
|---|---|---|
| JP | 2002-82257 | 3/2002 |
| JP | 2002-82257 A | 3/2002 |
| JP | 2004-309841 | 11/2004 |

OTHER PUBLICATIONS

International Search Report and Written Opinion, issued in International Patent Application No. PCT/JP2007/072022, dated Feb. 5, 2008.

* cited by examiner

*Primary Examiner* — Brian Healy
(74) *Attorney, Agent, or Firm* — McDermott Will & Emery LLP

(57) ABSTRACT

An optical connector in which the housing property into a cabinet or the like can be enhanced because of the compactification, and which can solve problems of the increase of the bending loss of an optical fiber, the breakage, and the like is obtained. In an optical connector which houses and holds a fusion spliced portion where a short optical fiber previously fitted to an optical connector ferrule is fusion-spliced with a coated optical fiber, one end of a protection sleeve which armors the fusion spliced portion is coupled to the optical connector ferrule. As a result, the length of the protection sleeve which covers the fusion spliced portion so that the fusion spliced portion is positioned at the middle can be set with reference to an end portion of the optical connector ferrule. Therefore, the protection sleeve can be shortened, and compactification of the optical connector can be realized.

38 Claims, 27 Drawing Sheets

OPTICAL CONNECTOR

TECHNICAL FIELD

The present invention relates to an optical connector which houses and holds a fusion spliced portion where a short optical fiber that is previously fitted to an optical connector ferrule is fusion-spliced with a coated optical fiber.

RELATED ART

In local optical wiring or the like, an optical connector must be attached to an optical fiber cable on the site.

Conventionally, as a structure for, on the site, connecting an optical connector ferrule with an end of a coated optical fiber, there is an optical connector which is disclosed in Patent Reference 1 (FIG. 18).

In the optical connector 110 disclosed in Patent Reference 1, a short optical fiber 103 that is previously fitted to an optical connector ferrule 102 is connected by means of fusion splice with a coated optical fiber 100 on the site, and the periphery of the fusion spliced portion 105 is covered and reinforced by a protection sleeve 101.

A connector housing 121 is configured so that the range from the optical connector ferrule 102 to a part of the coated optical fiber 100 in rear of the protection sleeve 101 is internally housed.

The connector housing 121 comprises: a plug frame 122 which houses the optical connector ferrule 102 in the state where the tip end of the ferrule is projected; a boot 123 which houses an end portion of the coated optical fiber 100; and a cylindrical stop ring 124 in which one end is fitted into and integrated with the plug frame 122 and the other end is fitted into and integrated with the boot 123. The optical connector ferrule 102 in the plug frame 122 is urged toward the tip end side by a compression coil spring 125. When the connector is connected, the compression coil spring 125 allows the optical connector ferrule 102 to retract, and maintains the pressure of a contact between the optical connector ferrule 102 and an optical connector ferrule of a counter optical connector, to a specified range.

In the optical connector 110, an end of the coated optical fiber and the optical connector ferrule are connected with each other in the following manner. As indicated in FIG. 19(a) showing a shape in which the connector housing is omitted, an end portion of the coated optical fiber 100 on the site is previously set to a state where it is passed through the protection sleeve 101 which protects the fusion spliced portion. Then, an end portion of the short optical fiber 103 which is previously fitted to the optical connector ferrule 102 held by the plug frame such as an SC connector, and that of the coated optical fiber 100 are set to a state where a coating is peeled off by a predetermined length, and thereafter the end portions butt against each other and are fusion spliced together. As shown in FIG. 19(b), thereafter, the protection sleeve 101 which is previously fitted to the coated optical fiber 100 is moved onto the fusion spliced portion 105, to attain a reinforce state where the protection sleeve 101 covers the fusion spliced portion 105. As a result, the optical connector 110 can surly protect the fusion spliced portion 105.

[Patent Reference 1] JP-A-2002-82257

In the end portions of the optical fibers to be fusion spliced together in the above-described connection, however, the lengths of portions 100a, 103a in which the coating is peeled off must be set to about 10 mm because the end portions are centered and positioned by using jigs. In order to allow the protection sleeve 101 to surely cover covered portions of the optical fibers, the length of the protection sleeve 101 must be set so that the overlap length between the covered portions of the optical fibers and the protection sleeve 101 is about 10 mm.

Namely, the length of the protection sleeve 101 is 40 mm or more. As a result, the size of the optical connector 110 is enlarged because the optical connector 110 has a size obtained by adding L and 40 mm wherein the length L of the exposed covered portion of the short optical fiber 103 and 40 mm is a length of the protection sleeve 101, and a sufficient housing space is hardly ensured. There is a case where it is difficult to incorporate the optical connector into a small cabinet or the like.

In order to prevent the size of the optical connector 110 from being enlarged, it may be contemplated that the length of the protection sleeve 101 is shortened. In this case, however, there is a possibility that the fixing position of the optical sleeve 101 may be axially displaced because of insufficient skill of the worker, an erroneous operation, or the like, and a naked optical fiber may be exposed. Therefore, the overlap length of the protection sleeve with respect to the covered portion of the coated optical fiber cannot be largely shortened.

Consequently, this fails to exert a large effect on shortening of the protection sleeve 101, and the problem in that the housing in a cabinet or the like is difficult still remains to be solved.

In the case of the optical connector 110, when, in connection of the connector, the optical connector ferrule 102 is retracted by the butting of a counter optical connector ferrule, a compressive load acts on the short optical fiber 103 between the optical connector ferrule 102 and the protection sleeve 101, and the short optical fiber 103 is bent by the compressive load, thereby producing a possibility that the bend loss may be increased.

SUMMARY OF THE INVENTION

It is an object of the invention to provide an optical connector in which the housing property into a small cabinet or the like can be enhanced, and which can solve problems of the increase of the bending loss of an optical fiber, the breakage, and the like.

In order to attain the object, the optical connector of a first aspect of the invention is an optical connector which houses and holds a fusion spliced portion where a short optical fiber fitted to an optical connector ferrule is fusion-spliced with a coated optical fiber, wherein one end of a protection sleeve which reinforces the fusion spliced portion is coupled to the optical connector ferrule.

The optical connector of a second aspect of the invention is characterized in that, in the optical connector of the first aspect, the protection sleeve comprises: a thermal shrinkable tube; and a core rod and an adhesive tube which are passed through the thermal shrinkable tube, and the protection sleeve is coupled to the optical connector ferrule.

The optical connector of a third aspect of the invention is characterized in that, in the optical connector of the first aspect, the coated optical fiber is attached into the optical connector in a state where an outer jacket of an end portion of an optical fiber cord is removed away by a predetermined length, and the protection sleeve covers an outer periphery of the coated optical fiber on another side where the protection sleeve is not coupled to the optical connector ferrule.

The optical connector of a fourth aspect of the invention is characterized in that, in the optical connector of the first aspect, the optical connector further comprises a plug frame which allows a tip end portion of the optical connector ferrule to be projected, and which houses the ferrule.

The optical connector of a fifth aspect of the invention is characterized in that, in the optical connector of the fourth aspect, the optical connector further comprises a rear housing which allows the protection sleeve to be placed in an internal space and is connected with the plug frame, and the rear housing comprises an engaging claw with which an engaging hole that is opened in the plug frame is engaged.

The optical connector of a sixth aspect of the invention is characterized in that, in the optical connector of the fifth aspect, tensile strength fibers disposed in the optical fiber cord are caulked and fixed to a rear end portion of the rear housing.

The optical connector of a seventh aspect of the invention is characterized in that, in the optical connector of the first aspect, the protection sleeve comprises: a thermal shrinkable tube; a core rod and an adhesive tube which are passed through the thermal shrinkable tube; and a coupling component which is secured to one end of the thermal shrinkable tube, and the coupling component is coupled to the optical connector ferrule.

The optical connector of an eighth aspect of the invention is characterized in that, in the optical connector of the seventh aspect, the core rod is fixed to the coupling component.

The optical connector of a ninth aspect of the invention is characterized in that, in the optical connector of the first aspect, the optical connector further comprises a plug frame which allows a tip end portion of the optical connector ferrule to be projected, and which houses the ferrule, and an guide groove which guides a positioning protrusion to be movable in a fiber axial direction is formed in the plug frame, the positioning protrusion projecting from an outer peripheral surface of the protection sleeve.

The optical connector of a tenth aspect of the invention is characterized in that, in the optical connector of the ninth aspect, the optical connector further comprises a rear housing which allows the protection sleeve to be placed in an internal space and is connected with the plug frame, and in which a boot that protects the coated optical fiber is integrally formed, and the rear housing comprises an engaging hole with which an engaging claw that is projected from the plug frame is engaged.

The optical connector of a eleventh aspect of the invention is characterized in that, in the optical connector of the tenth aspect, a space is formed between another end of the protection sleeve and an inner end wall of the rear housing.

The optical connector of a twelfth aspect of the invention is characterized in that, in the optical connector of the tenth aspect, the coated optical fiber is attached into the optical connector in a state where an outer jacket of an end portion of an optical fiber cord is removed away by a predetermined length, and a reinforcing tube which covers the coated optical fiber is coupled to a rear end of the rear housing.

The optical connector of a thirteenth aspect of the invention is characterized in that, in the optical connector of the twelfth aspect, the reinforcing tube is coupled to the rear end of the rear housing via a coupling member, and the coupling member caulks and fixes tensile strength fibers disposed in the optical fiber cord.

The optical connector of a fourteenth aspect of the invention is characterized in that, in the optical connector of the first aspect, positions of the short optical fiber placed in the protection sleeve, and the coated optical fiber coincide with an axial center of the optical connector ferrule.

According to the optical connector of the invention, since one end of the protection sleeve is coupled to the optical connector ferrule, the protection sleeve which is used for setting the fusion spliced portion to the middle position is accurately positioned irrespective of the skill level of the worker. As a result, the overlap length between an end portion of the protection sleeve and a covered portion of the coated optical fiber can be shortened. Therefore, the length of the protection sleeve can be largely shortened, and that of the optical connector can be compactified.

Because of the compactification of the optical connector, therefore, the housing property into a small cabinet or the like can be enhanced.

The protection sleeve which covers the periphery of the fusion spliced portion is coupled to the optical connector ferrule. When, in connection of the connector, the optical connector ferrule is retracted by butting of a counter optical connector ferrule, also the protection sleeve is retracted integrally with the optical connector ferrule. Therefore, a large compressive load does not act on the short optical fiber.

In a work of connecting the connector, consequently, it is possible to prevent a large bending load from acting on the short optical fiber fitted to the optical connector ferrule, thereby solving problems of the increase of the bending loss of an optical fiber, the breakage, and the like.

Even when the coated optical fiber is exposed from the rear side of the optical connector in a state where the outer jacket of the optical fiber cord is removed away, the exposed portion is covered and repaired by the reinforcing tube.

Even when, in order to improve a fusion-splicing work to be performed on the site, the outer jacket of the optical fiber cord is largely removed away to expose the coated optical fiber from the optical connector, therefore, the coverage by the reinforcing tube can prevent the increase of the bend loss of the optical fiber, and the like from occurring.

Figure 1:
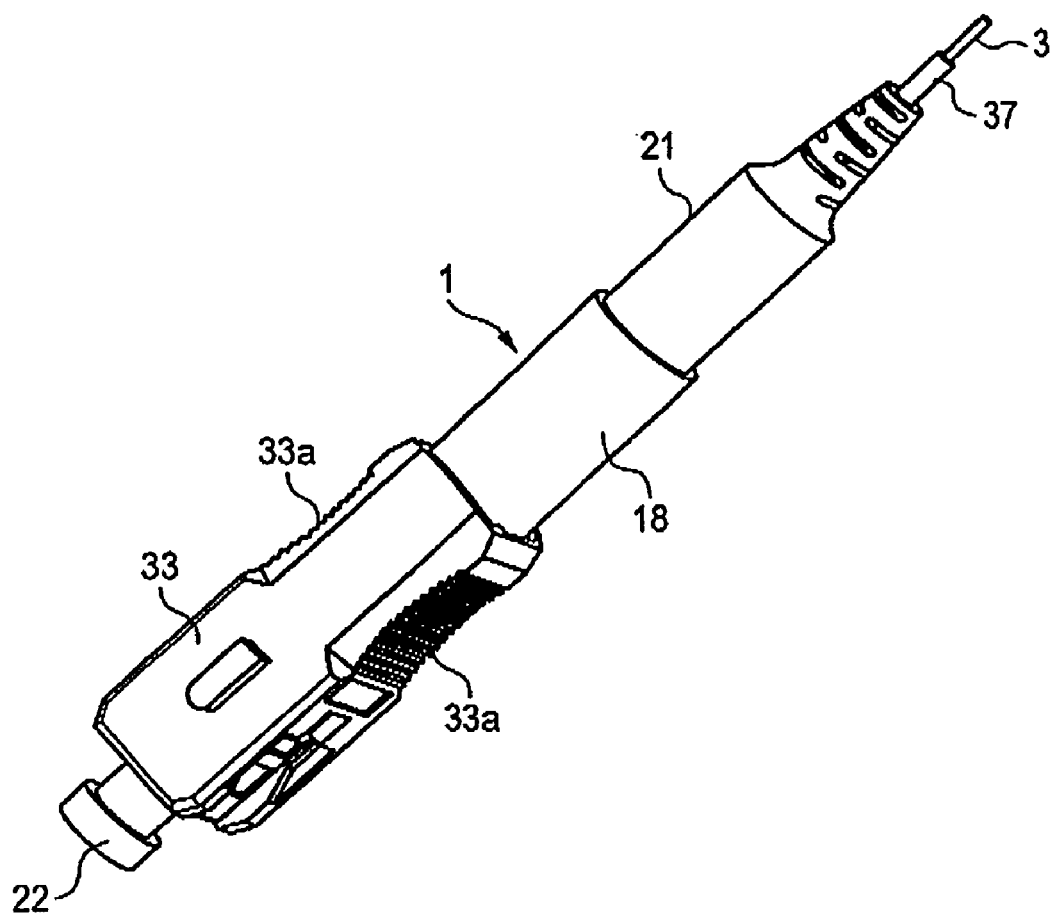
FIG. 1 is an external perspective view of an embodiment of the optical connector of the invention.

DESCRIPTION OF REFERENCE NUMERALS AND SIGNS 1, 1A, 1B optical connector
3 coated optical fiber
5 short optical fiber
7, 85 optical connector ferrule
7*b* diameter-enlarged portion
7*c* sleeve coupling protrusion
9, 83 plug frame
9*a* diameter-contracted portion
9*b* engaging groove stopper
11*a* protrusion
11*c* guide groove
13 fusion spliced portion
15, 87 protection sleeve
17 internal space
21, 95 boot
23, 89 ferrule press spring
25 thermal shrinkable tube
27 core rod
29 adhesive tube
31 coupling component
31*b* engagement hole
31*c* positioning protrusion
33 SC connector knob
35 space
37, 42 reinforcing tube
38 thermal shrinkable tube
40 reinforcing tube assembly
44, 92 caulking ring
70 optical fiber cord
72 tensile strength fiber

BEST MODE FOR CARRYING OUT THE INVENTION

Hereinafter, preferred embodiments of the optical connector of the invention will be described in detail with reference to the accompanying drawings.

Figure 2:
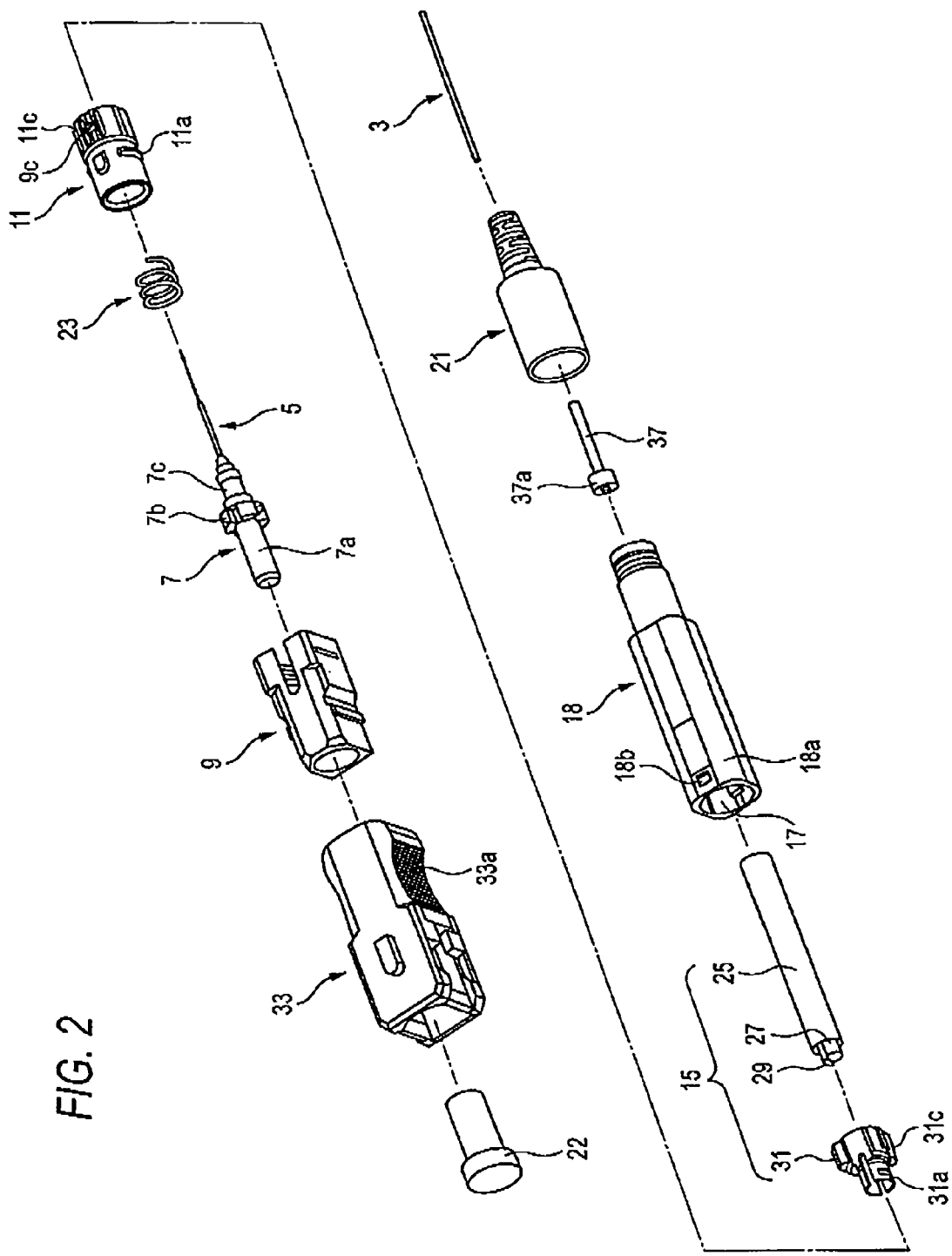
FIG. 2 is an exploded perspective view of the optical connector shown in FIG. 1.
Figure 3:
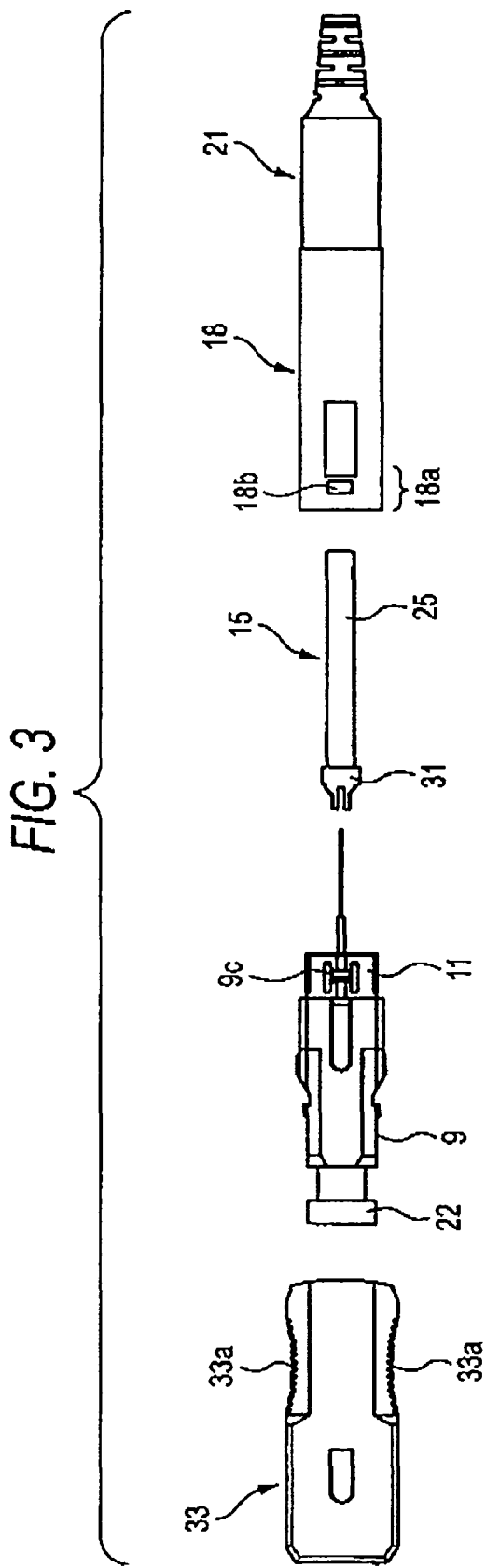
FIG. 3 is an exploded plan view of the optical connector shown in FIG. 1.
Figure 4:
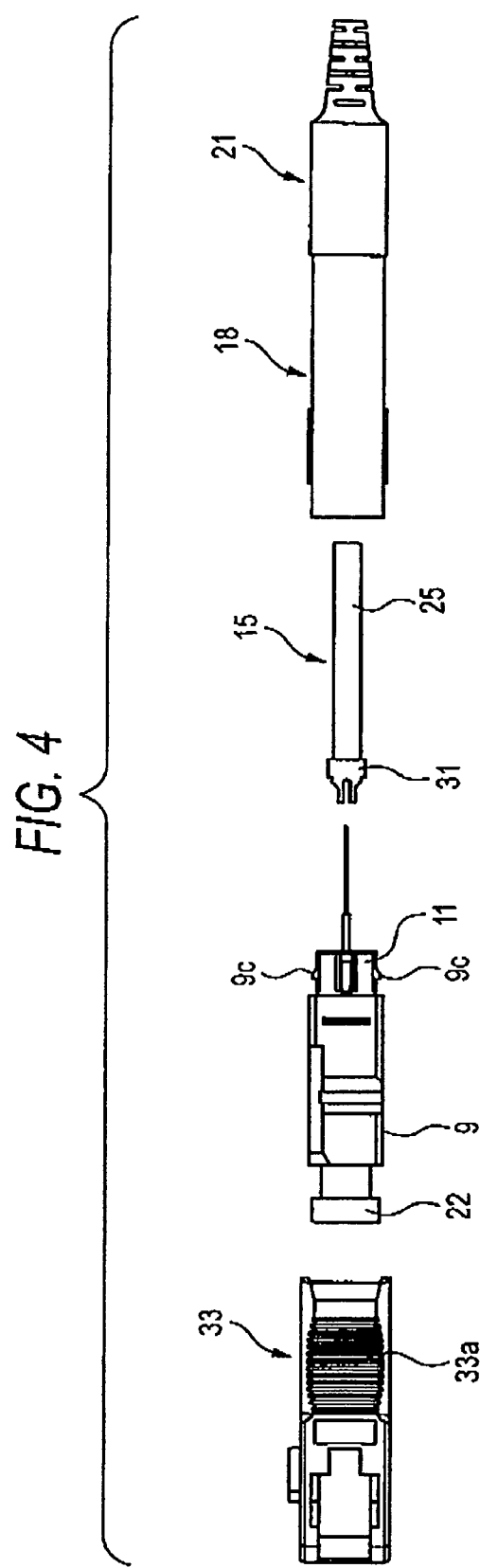
FIG. 4 is an exploded side view of the optical connector shown in FIG. 1.
Figure 5:
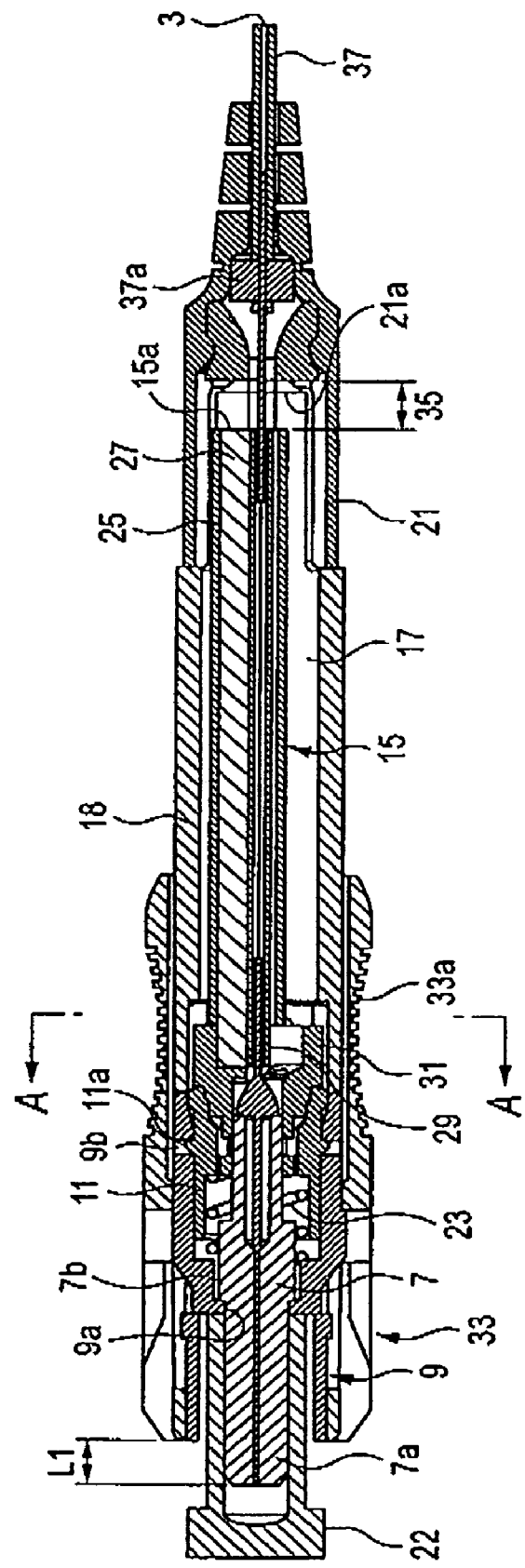
FIG. 5 is a longitudinal section view of the optical connector shown in FIG. 1.

FIG. 1 is an external perspective view of an embodiment of the optical connector of the invention, FIG. 2 is an exploded perspective view of the optical connector shown in FIG. 1, FIG. 3 is an exploded plan view of the optical connector, FIG. 4 is an exploded side view of the optical connector, and FIG. 5 is a longitudinal section view of the optical connector.

Figure 13:
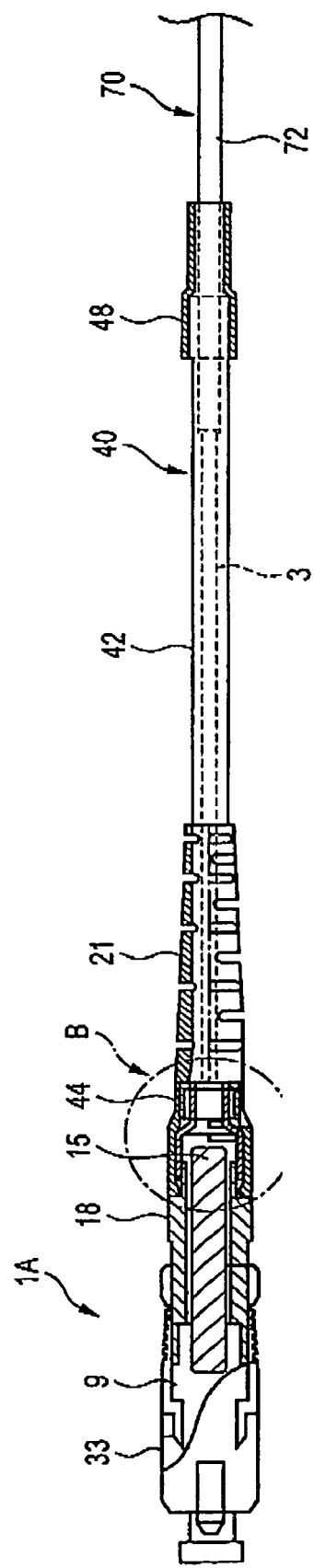
FIG. 13 is a longitudinal section view showing another embodiment of the optical connector of the invention.

The optical connector 1 of the embodiment is attached to an end portion of a coated optical fiber 3 which is exposed by removing away a predetermined length of an outer jacket 72 of an optical fiber cord 70 (the both components are shown in FIG. 13) on the site. The optical connector comprises: an optical connector ferrule 7 to which a short optical fiber 5 that is to be fusion-spliced with the coated optical fiber 3 is previously fitted; a plug frame 9 which houses and holds the optical connector ferrule 7; a stopper 11 which is approximately cylindrical, and which is fitted and attached to an opening on the basal end side of the plug frame 9 into which the optical connector ferrule 7 is inserted; a protection sleeve 15 which covers the outer periphery of a fusion spliced portion 13 (see FIG. 11) between the coated optical fiber 3 and the short optical fiber 5 to armor the fusion spliced portion 13; a rear housing 18 which has an internal space 17 for placing the protection sleeve 15, and in which the tip end is coupled to the plug frame 9 to be integrated therewith; and a boot 21 which houses the vicinity of the end portion of the coated optical fiber 3 to be fusion-spliced with the short optical fiber 5, thereby protecting the coated optical fiber 3, and in which the tip end is coupled and integrated with the basal end of the rear housing 18.

Figure 6:
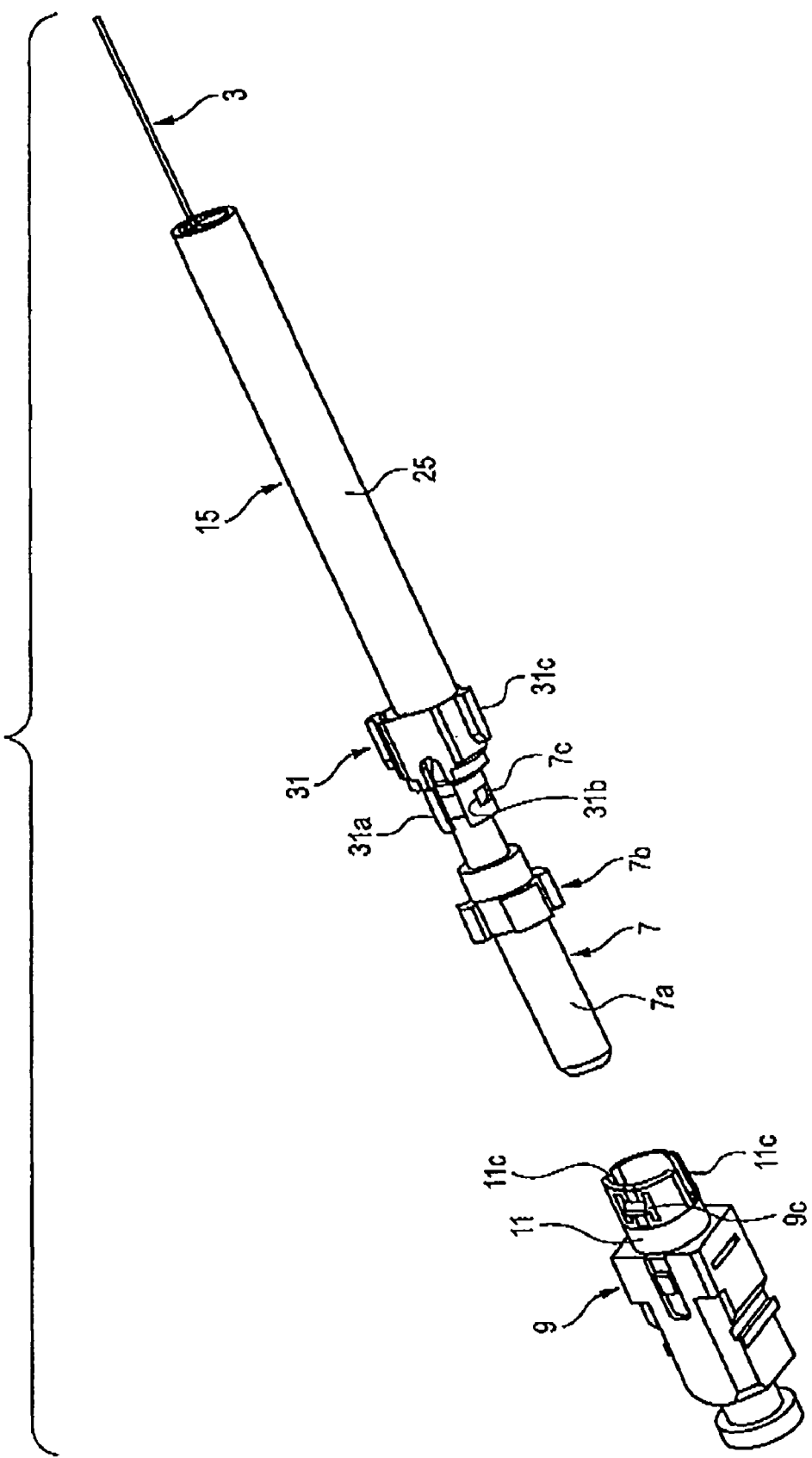
FIG. 6 is an exploded perspective view of a plug frame shown in FIG. 2, and an optical connector ferrule which is housed and held in the plug frame.
Figure 7:
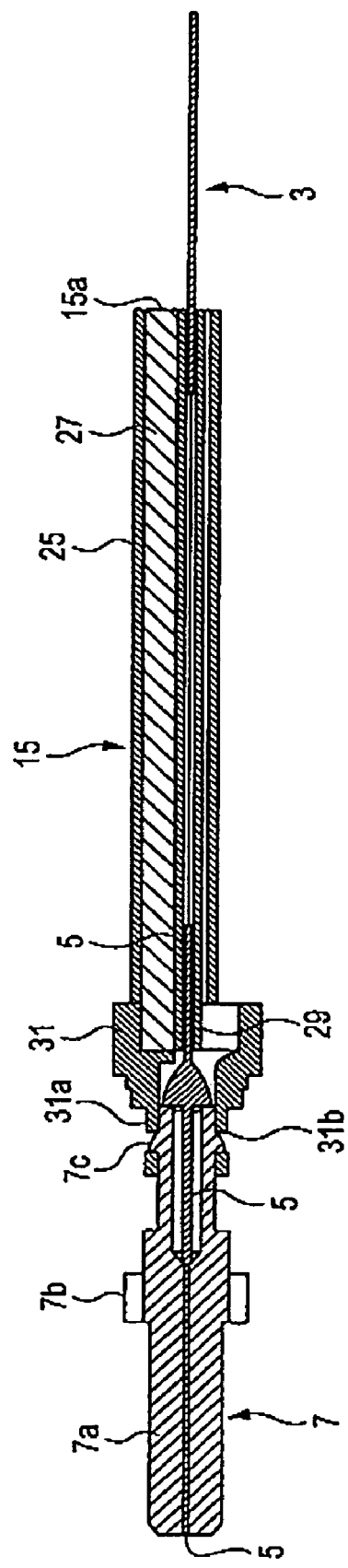
FIG. 7 is a longitudinal section view of the optical connector ferrule shown in FIG. 6, and a protection sleeve connected with the optical connector ferrule.

The optical connector ferrule 7 has a shape where an diameter-enlarged portion 7*b* in which the outer diameter is expanded is equipped in rear of a tip end shaft portion 7*a* that is to be butt-connected with a counter optical connector ferrule. The short optical fiber 5 is fitted to the ferrule so that the center axis coincides with the tip end shaft portion 7*a*. As shown in FIGS. 6 and 7, sleeve coupling protrusions 7*c* for coupling the protection sleeve 15 which will be described later are protruded from the outer periphery of the basal end side from which the short optical fiber 5 of the optical connector ferrule 7 is extended.

When the optical connector ferrule 7 is inserted into the opening on the basal end side of the plug frame 9, as shown in FIG. 5, the front end of the diameter-enlarged portion 7*b* butts against a diameter-contracted portion 9*a* which is projected from the inner periphery of the plug frame 9, thereby attaining a state where the forward movement is restricted. In this state, as shown in FIG. 5, the position restriction is conducted in a state where the tip end of the optical connector ferrule 7 is projected by a predetermined length L1 from the tip end of the plug frame 9.

As shown in FIGS. 2 to 5, in order to prevent dust and the like from adhering to the fiber end face during a storage period or the like, a dust cap 22 is put on and attached to the tip end of the optical connector ferrule 7 which is positioned to the plug frame 9.

The tip end face of the optical connector ferrule 7 is previously mirror-polished, so that a polishing process on the site is not necessary.

A ferrule press spring 23 is inserted into the plug frame 9 into which the optical connector ferrule 7 is inserted. The ferrule press spring 23 is a compression coil spring which is clamped and held between the front end of the stopper 11 fitted into the inner periphery of the opening on the basal end side of the plug frame 9, and the diameter-enlarged portion 7b of the optical connector ferrule 7. The spring causes the diameter-enlarged portion 7b of the optical connector ferrule 7 to butt against the diameter-contracted portion 9a of the plug frame 9, and at the same time elastically supports the ferrule in a retractable manner.

The stopper 11 fitted into the inner periphery of the opening on the basal end side of the plug frame 9 is fixed to the basal end side of the plug frame 9 by engaging a protrusion 11a (see FIG. 2) which is circumferentially projected from the outer periphery of the stopper, with an engaging groove 9b (see FIG. 5) which is formed in an inner wall portion of the plug frame 9.

Figure 11:
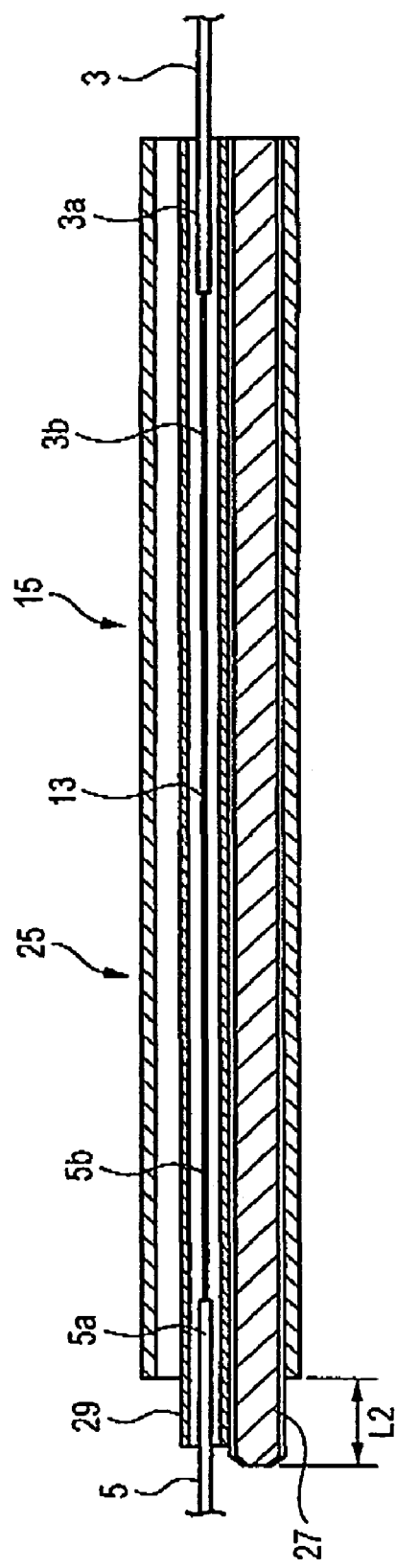
FIG. 11 is a section view taken along the line C-C of FIG. 10.

As shown in FIG. 11, the fusion spliced portion 13 is formed by: butting a portion 5b where a coating 5a of an end portion of the short optical fiber 5 is peeled off, against a portion 3b where a coating 3a of an end portion of the coated optical fiber 3 is peeled off; and fusion splicing the butted fiber end faces together.

The end face of the short optical fiber 5 where the coating 5a is peeled off is previously mirror-processed by means of cleavage in which bending stress is applied to the optical fiber to cut the fiber, or polishing, so that a mirroring process on the site is not necessary.

Preferably, before the fusion splice, the end face of the short optical fiber 5 is subjected to an electric discharging process to be chamfered, so that chipping from an edge due to polishing can be prevented from occurring. The short optical fiber 5 is transported to the site in the state where the coating is removed away. As the fiber, therefore, a carbon-coated fiber is preferably used because the strength reduction due to damage or water absorption is suppressed. Preferably, the short optical fiber 5 is a fiber in which the MFD is small, and which is highly resistant to bending.

Figure 8:
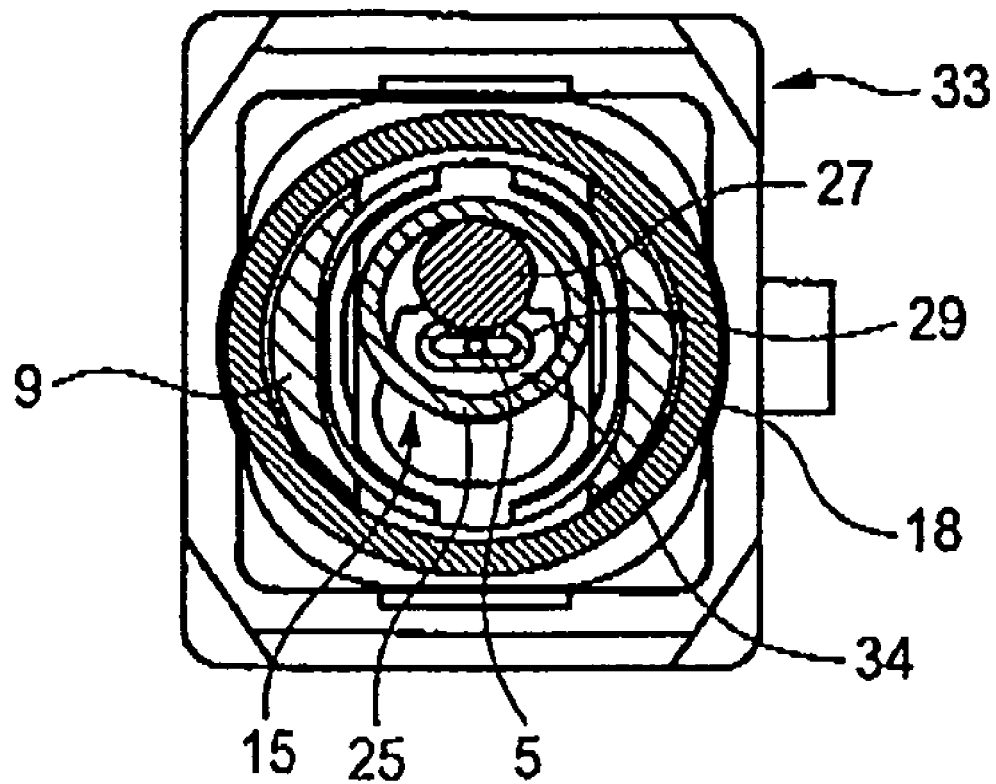
FIG. 8 is a section view taken along the line A-A of FIG. 5.

As shown in FIGS. 7 and 8, the protection sleeve 15 comprises: a thermal shrinkable tube 25; a core rod 27 and adhesive tube 29 which are passed through the thermal shrinkable tube 25; and a coupling component 31 which is secured to one end of the thermal shrinkable tube 25. The coupling component 31 is coupled to the optical connector ferrule 7.

When the thermal shrinkable tube 25 is heated to a predetermined temperature by a heating apparatus, the tube thermal-shrinks to attain a state where the tube is closely contacted with the core rod 27 which passes through the tube.

Figure 10:
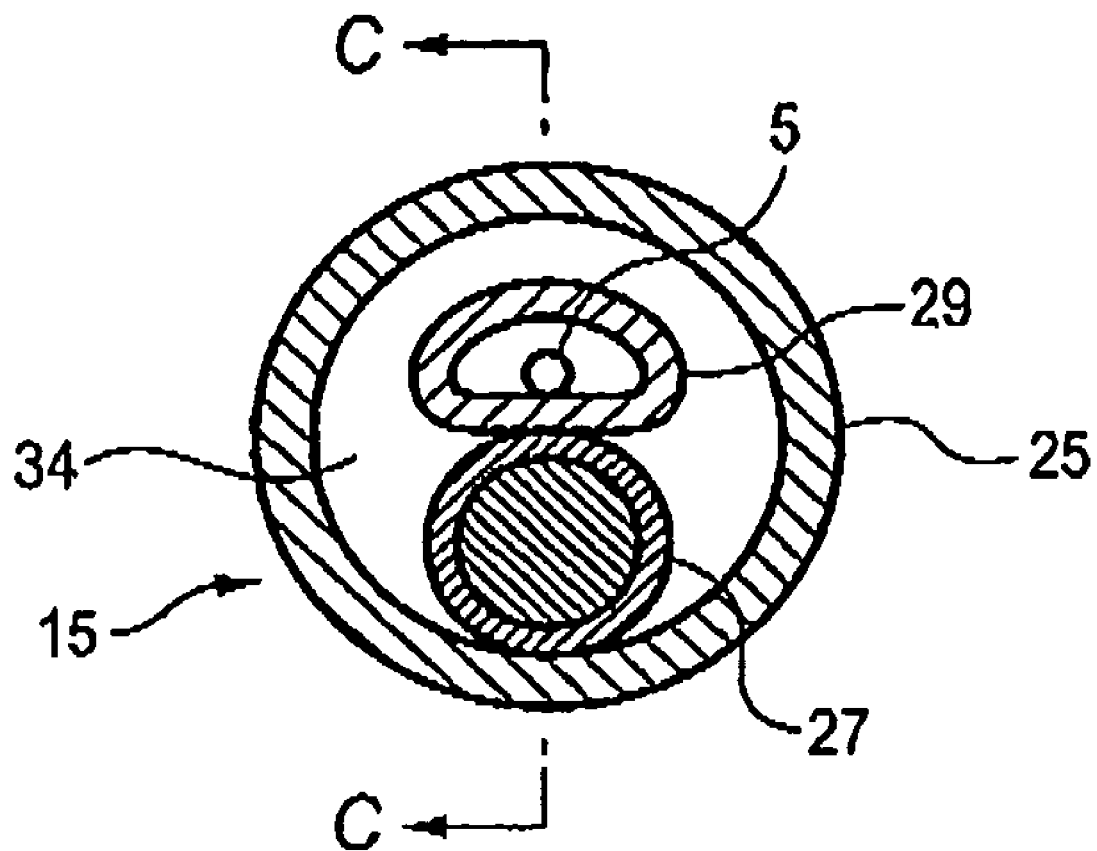
FIG. 10 is a section view taken along the line B-B of FIG. 9.

As shown in FIGS. 8 and 10, the core rod 27 is a solid round rod which has a circular section shape, and which is passed through the thermal shrinkable tube 25 as a core member for reinforcement. A copper wire, glass, or the like may be used as the core rod 27.

The adhesive tube 29 is a tube which is made an adhesive agent, and which is passed through the thermal shrinkable tube 25 in a form where the tube vertically adjoins the core rod 27, and softened by the heating for thermal-shrinking the thermal shrinkable tube 25, so as to function as an adhesive agent which fills a gap 34 between the thermal shrinkable tube 25 and the core rod 27.

Figure 9:
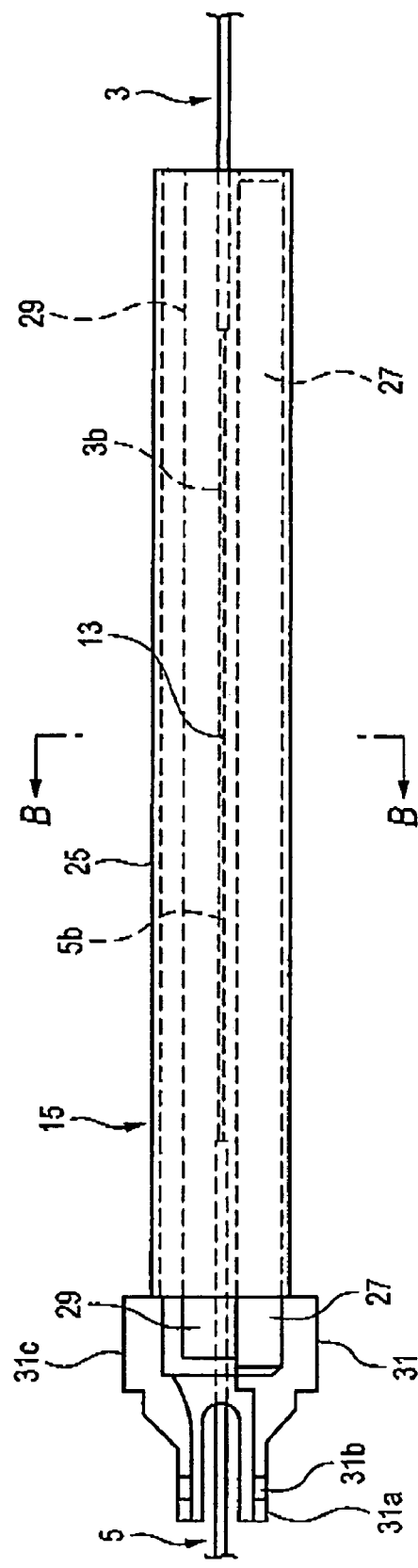
FIG. 9 is a side view of a protection sleeve shown in FIG. 2 and before a thermal shrinking process.

In the protection sleeve 15, initially, the thermal shrinkable tube 25, the core rod 27, and the adhesive tube 29 are positioned in a state where end portions of the core rod 27 and the adhesive tube 29 are projected by a predetermined length L2 from one end of the thermal shrinkable tube 25 as shown in FIG. 11, and, in the positioned state, the basal end of the coupling component 31 is fixed to the one end of the thermal shrinkable tube 25 as shown in FIG. 9.

The coupling component 31 is fixed to and integrated with the end portions of the core rod 27 and the adhesive tube 29 by fixation, adhesion, or welding of the end portions.

In the coupling component 31, as shown in FIG. 6, the end portion on the side of the optical connector ferrule 7 is formed as a cylinder portion 31a which is to be fitted onto the basal end of the optical connector ferrule 7. In the cylinder portion 31a, as shown in FIG. 9, engagement holes 31b with which the sleeve coupling protrusions 7c of the optical connector ferrule 7 are to be engaged are formed.

When the engagement holes 31b are engaged with the sleeve coupling protrusions 7c, a state where the one end of the protection sleeve 15 is coupled to and integrated with the optical connector ferrule 7 is attained.

When the optical connector 1 is to be assembled, the coated optical fiber 3 is previously passed through the above-described protection sleeve 15 together with the rear housing 18 and the boot 21 as shown in FIG. 2, and, after the fusion splice between the coated optical fiber 3 and the short optical fiber 5, the protection sleeve 15 is returned onto the fusion spliced portion 13. The lengths of the short optical fiber 5, the thermal shrinkable tube 25 of the protection sleeve 15, the core rod 27, and the adhesive tube 29 are set so that, when the coupling component 31 is coupled to the basal end of the optical connector ferrule 7, the fusion spliced portion 13 is just positioned at an approximately intermediate position in the longitudinal direction of the protection sleeve 15.

More specifically, after the fusion splice between the coated optical fiber 3 and the short optical fiber 5, the protection sleeve 15 is moved on the fusion spliced portion 13 so as to cover the fusion spliced portion 13, the coupling component 31 of the protection sleeve 15 is coupled to the optical connector ferrule 7, and thereafter the thermal shrinkable tube 25 is heated to fix the coated optical fiber 3 and the short optical fiber 5 in front and rear of the fusion spliced portion 13, to the core rod 27 in a vertically adjoining state.

Figure 12:
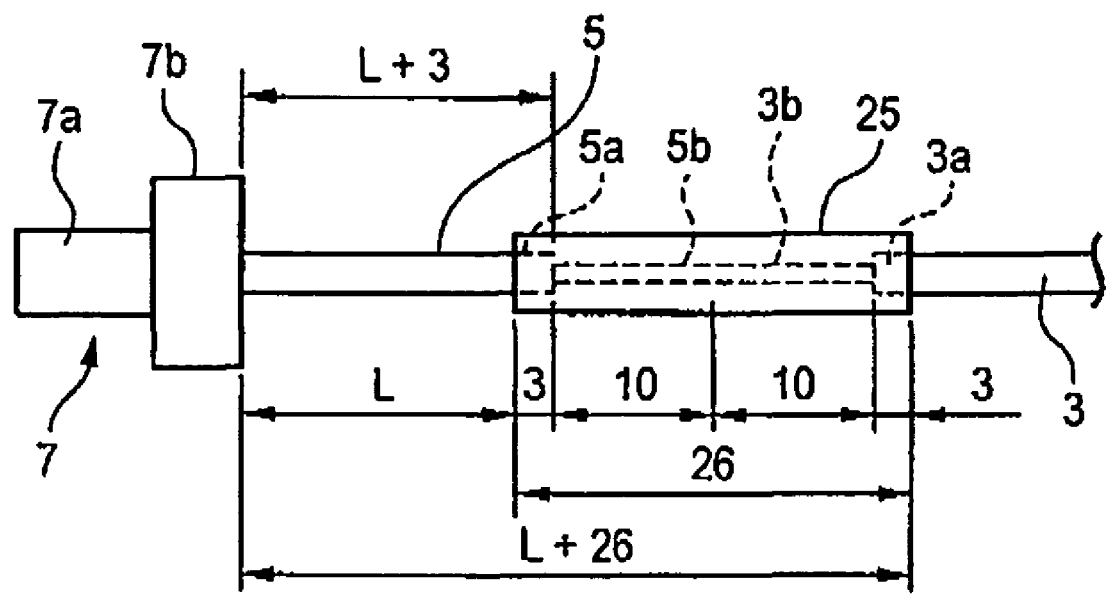
FIG. 12 is a diagram illustrating the length of the protection sleeve in rear of the optical connector ferrule shown in FIG. 7.

The dimensions of the components are set so that, when the thermal shrinkable tube 25 thermal-shrinks as described above, end portions of the thermal shrinkable tube 25 overlap with the coating 3a of the coated optical fiber 3 and the coating 5a of the short optical fiber 5 by 3 mm or longer as shown in FIG. 12.

In the embodiment, the diameters and like dimensions of the coupling component 31, the core rod 27, and the like are set so that, in the state where the thermal shrinkable tube 25 thermal-shrinks as shown in FIG. 7, the positions of the short optical fiber 5 placed in the protection sleeve 15, and the coated optical fiber 3 coincide with the axial center of the optical connector ferrule 7.

As shown in FIGS. 2 and 6, positioning protrusions 31c which extend in the axial direction are disposed on the outer peripheral surface of the above-described coupling component 31. Guide grooves 11c which guide the positioning protrusions 31c to be movable in the fiber axial direction are disposed in the stopper 11 which is fixed to the basal end side of the plug frame 9.

When the optical connector ferrule 7 with which the protection sleeve 15 is coupled and integrated is to be inserted into the plug frame 9, therefore, the positioning protrusions 31c are inserted so as to coincide with the positions of the guide grooves 11c, thereby enabling the optical connector ferrule 7 and the protection sleeve 15 to be smoothly attached into the plug frame 9.

The rear housing 18 is a cylindrical structure which covers the periphery of the protection sleeve 15, and formed by injection molding of a resin or the like. As shown in FIGS. 3 to 5, the tip end of the rear housing 18 is formed as a cylinder portion 18a which is to be fitted onto the basal end of the plug frame 9. The cylinder portion 18a comprises an engaging hole 18b with which, when the cylinder portion is fitted onto the basal end of the plug frame 9, an engaging claw 9c that is projectingly formed on the outer periphery of the basal end of the plug frame 9 is engaged.

After the thermal shrinkage process on the protection sleeve 15, the thus configured rear housing 18 is put on the protection sleeve 15, and the engaging hole 18b on the tip end side is engaged with the engaging claw 9c of the plug frame 9, whereby the rear housing is coupled to and integrated with the plug frame 9.

In the case of the embodiment, an SC connector knob 33 which functions as a knob portion when the connector is connected is put on and attached to the outer periphery of the plug frame 9 to which the rear housing 18 is coupled. The SC connector knob 33 is an outer jacket member which provides the appearance of the tip end side of the optical connector 1. Anti-slip corrugations 33a for facilitating gripping are formed on the outer side faces.

The boot 21 is used for protecting the coated optical fiber 3 so as to prevent a sharp bend from occurring in the coated optical fiber 3 which rearward extends from the rear housing 18. The tip end of the boot is fitted or screwed to the basal end of the rear housing 18, whereby the boot is coupled to and integrated with the rear housing 18.

Alternatively, the boot may be formed integrally with the rear housing 18 by injection molding of a resin.

In the case of the embodiment, as shown in FIG. 5, a space 35 which allows the protection sleeve 15 to retract is formed between the other end 15a of the protection sleeve 15 and an inner wall end 21a of the boot 21 which is opposed to the other end 15a.

Furthermore, as shown in FIGS. 2 and 5, a reinforcing tube 37 which covers the coated optical fiber 3 is inserted and attached in rear of the inner wall end 21a of the boot 21.

In the reinforcing tube 37, a locking portion 37a in which the diameter is increased is disposed at the tip end. The rearward movement of the boot 21 is restricted by engagement of the locking portion 37a. The reinforcing tube 37 is a tube which has an adequate elasticity, and prevents a sharp bend from occurring in the coated optical fiber 3.

In the above-described optical connector 1, the one end of the protection sleeve 15 is coupled to the optical connector ferrule 7, and hence the protection sleeve 15 is accurately positioned irrespective of the skill level of the worker. As a result, the overlap length between the end portion of the protection sleeve 15 and the covered portion of the coated optical fiber 3 can be shortened to about 3 mm as shown in FIG. 12. Therefore, the length of the protection sleeve 15 can be largely shortened because the optical connector 1 has a size obtained size obtained by adding L and 26 mm wherein the length L of the exposed covered portion of the short optical fiber 5 and 26 mm is a length of the protection sleeve 15, and that of the optical connector 1 can be compactified.

Because of the compactification of the optical connector 1, therefore, the housing property into a small aerial closure or the like can be enhanced.

Moreover, the protection sleeve 15 which covers the short optical fiber 5 previously fitted to the optical connector ferrule 7 and the periphery of the fusion spliced portion 13 is coupled to the optical connector ferrule 7. When, in connection of the connector, the optical connector ferrule 7 is retracted by butting of the counter optical connector ferrule, also the protection sleeve 15 is retracted integrally with the optical connector ferrule 7. Therefore, a large compressive load does not act on the short optical fiber 5.

In a work of connecting the connector, consequently, it is possible to prevent a large bending load from acting on the short optical fiber 5 fitted to the optical connector ferrule 7, thereby solving the problems of the increase of the bending loss of an optical fiber, the breakage, and the like.

In the optical connector 1 of the embodiment, the protection sleeve 15 comprises: the thermal shrinkable tube 25; the core rod 27 and adhesive tube 29 which are passed through the thermal shrinkable tube 25; and the coupling component 31 which is secured to one end of the thermal shrinkable tube 25, and the coupling component 31 is coupled to the optical connector ferrule 7.

Before the short optical fiber 5 fitted to the optical connector ferrule 7 is fusion-spliced with the coated optical fiber 3 on the site, therefore, the protection sleeve 15 is set to a state where an end portion of the coated optical fiber 3 on the site is passed. After the short optical fiber 5 is fusion-spliced with the coated optical fiber 3, the protection sleeve 15 is moved toward the optical connector ferrule 7, and the coupling component 31 at the one end of the protection sleeve 15 is coupled to the optical connector ferrule 7, whereby the state where the protection sleeve 15 is coupled to the optical connector ferrule 7 can be easily attained.

In the protection sleeve 15, by the simple operation in which, after the coupling component 31 at the one end of the protection sleeve is coupled to the optical connector ferrule 7, the thermal shrinkable tube 25 in the outer periphery of the sleeve is caused to thermal-shrink by the heating process using a heating apparatus, the fusion spliced portion 13 between the short optical fiber 5 and the coated optical fiber 3 on the site can be firmly held to the state where they vertically adjoin the core rod 27. Therefore, the fusion spliced portion 13 can be rigidly reinforced.

Even in a site where a working facility and the like are hardly prepared, therefore, the fusion spliced portion 13 can be protected easily and surely by the protection sleeve 15.

In the optical connector 1 of the embodiment, the coupling component 31 has the configuration in which the thermal shrinkable tube 25 and the core rod 27 are fixed by fixation, adhesion, or welding.

In the protection sleeve 15 coupled to the optical connector ferrule 7, namely, the core rod 27 which vertically adjoins the fusion spliced portion 13, and the thermal shrinkable tube 25 which presses the fusion spliced portion 13 against the core rod 27 are fixed to the coupling component 31 coupled to the optical connector ferrule 7. Therefore, a bend or the like does not occur in the joint of the coupling component 31 and the core rod 27, and the optical fibers and the fusion spliced portion 13 in the protection sleeve 15 can be maintained to a satisfactory state where a bend hardly occurs. In the optical connector 1 of the embodiment, the coupling component 31 has the structure in which the thermal shrinkable tube and the core rod are fixed. Alternatively, the coupling may be performed while only the core rod is fixed.

In the optical connector 1 of the embodiment, the tip end portion of the optical connector ferrule 7 is projected, the plug frame 9 which houses and holds the ferrule is disposed, and the guide grooves 11c which guide the positioning protrusions 31c projected from the outer peripheral surface of the protection sleeve 15 to be movable in the fiber axial direction are formed in the plug frame 9.

Since the positioning protrusions 31c projected from the outer peripheral surface of the protection sleeve 15 are engaged with the guide grooves 11c of the plug frame 9 which houses and holds the optical connector ferrule 7, the protection sleeve 15 in which the coupling component 31 at one end is coupled to the optical connector ferrule 7 is held so as to be movable in the fiber axial direction with respect to the plug frame 9.

In the case where, in connection of the connector, the optical connector ferrule 7 is retracted by butting of the counter optical connector ferrule, therefore, the operation in which the protection sleeve 15 is retracted integrally with the optical connector ferrule 7 can be smoothly performed.

In the optical connector 1 of the embodiment, the rear housing 18 which is connected with the plug frame 9 in the state where the protection sleeve 15 is placed in the internal space 17, and in which the boot 21 for protecting the coated optical fiber 3 is integrally formed is disposed, and the rear housing 18 comprises the engaging hole 18b with which the engaging claw 9c that is projectingly formed on the plug frame 9 is engaged.

Therefore, the outer periphery of the protection sleeve 15 is covered and protected by the rear housing 18, and hence the handling in the case where the optical connector is housed in an aerial closure or the like can be facilitated.

The rear housing 18 can be connected with the plug frame 9 by simply engaging the engaging claw 9c formed on the plug frame 9 with the engaging hole 18b formed in the position close to the plug frame 9. Therefore, the optical connector can be easily assembled on the site, and the work on the site can be facilitated.

In the optical connector 1 of the embodiment, in the case where, in connection of the connector, the optical connector ferrule 7 is retracted by butting of the counter optical connector ferrule, also the protection sleeve 15 is retracted integrally with the optical connector ferrule 7. However, the space 35 is formed between the other end of the protection sleeve 15 and the inner wall end of the rear housing 18. Therefore, the rearward movement of the protection sleeve 15 is not restricted, and the retraction of the optical connector ferrule 7 in connection of the connector can be received without compulsion.

Next, another embodiment of the optical connector of the invention will be described.

The optical connector of the embodiment comprises a reinforcing tube which, when the optical connector is attached to an end portion of an optical fiber cord on the site, covers a coated optical fiber exposed from the rear side of the optical connector, to protect the coated optical fiber. Such a reinforcing tube is used also in the previous embodiment. In the embodiment, the configuration of the reinforcing tube and an attaching method will be specifically described in detail.

In the embodiment, the configuration except the reinforcing tube is identical with that of the previous embodiment, and hence identical components and portions are denoted by the same reference numerals, and their description is omitted.

Figure 14:
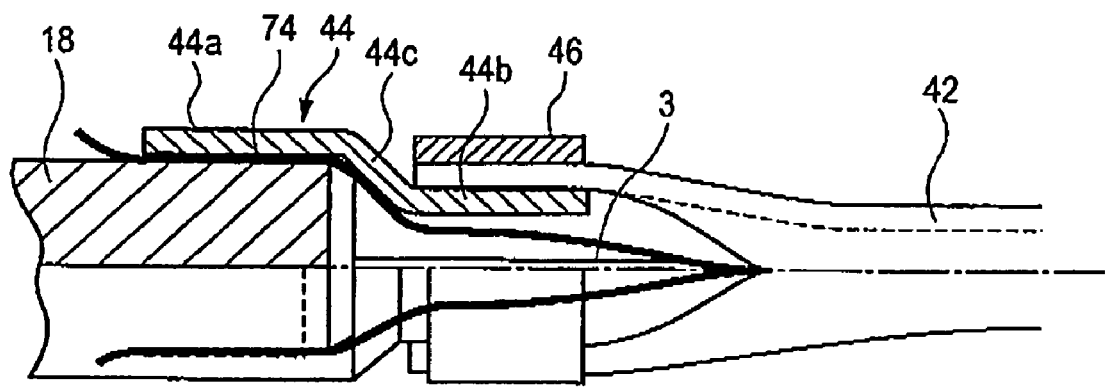
FIG. 14 is an enlarged section view of portion B of FIG. 13.
Figure 15:
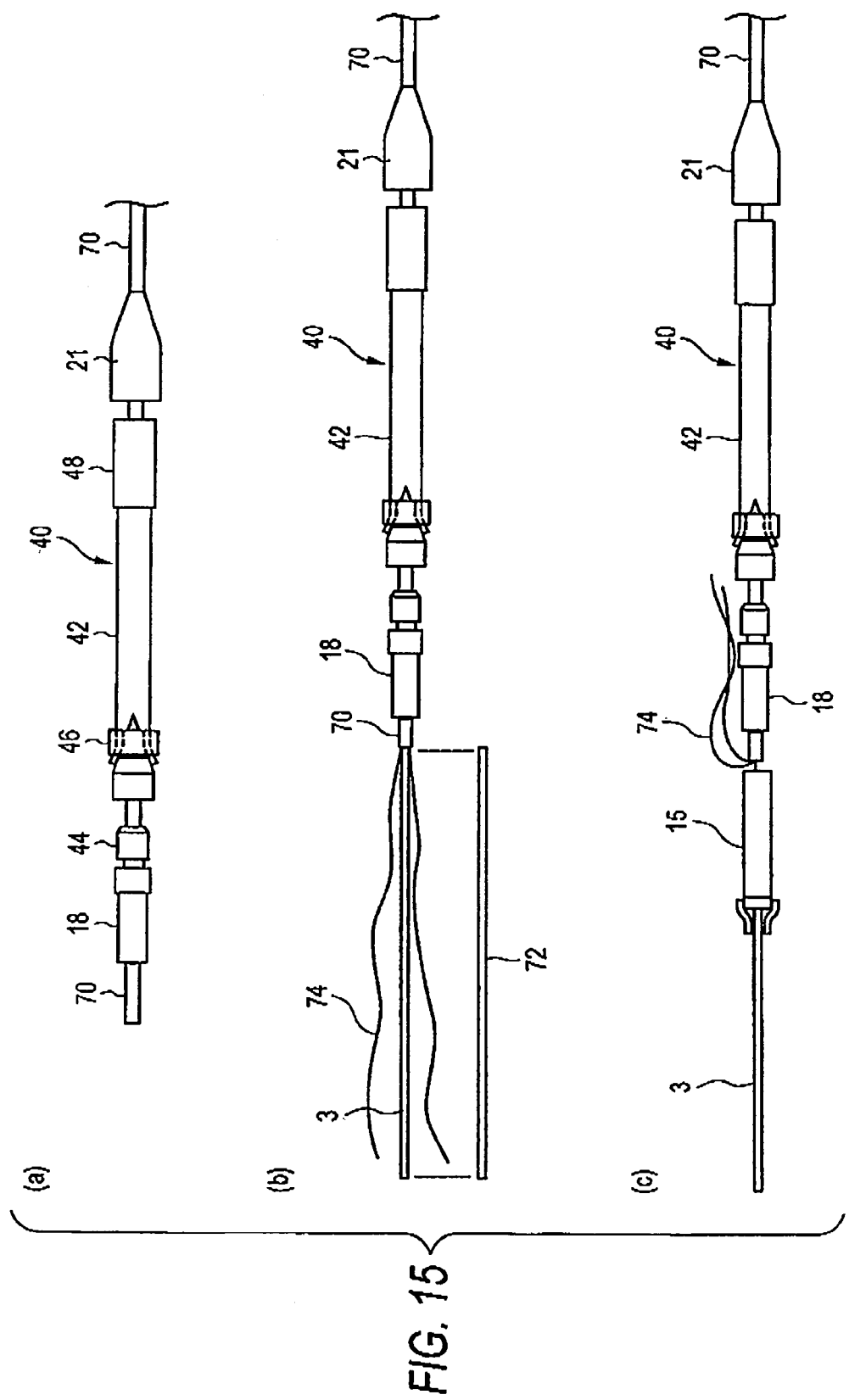
FIGS. 15(a) to 15(c) are step-by-step views illustrating a procedure of assembling the optical connector.

FIG. 13 is a longitudinal section view of the other embodiment of the optical connector of the invention, FIG. 14 is an enlarged section view of portion B of FIG. 13, and FIG. 15 is a step-by-step view illustrating a procedure of assembling the optical connector.

In the optical connector 1A of the embodiment, in the case where the short optical fiber 5 of the optical connector ferrule 7 is to be fusion-spliced with the coated optical fiber 3 which is exposed by removing away the outer jacket 72 of the optical fiber cord 70 on the site, when the outer jacket 72 of an end portion of the optical fiber cord 70 is largely peeled off in order to improve the fusion-splicing work, the coated optical fiber 3 is exposed in rear of the optical connector 1A. Therefore, the optical connector comprises the reinforcing tube 42 which covers the exposed coated optical fiber 3 to protect the coated optical fiber 3.

In the optical fiber cord 70, when the outer jacket 72 in the end portion is peeled off (removed), the coated optical fiber 3 in which the outer periphery is covered with Kevlar fibers (see FIG. 14) that are tensile strength fibers 74 is exposed.

The tip end of the reinforcing tube 42 which is passed through the boot 21 is coupled to the rear end of the rear housing 18 by a caulking ring 44 which functions as a coupling member. Specifically, as shown in FIG. 14, the caulking ring 44 is formed into an approximately cylindrical member in which a large-diameter portion 44a formed in one end, and a small-diameter portion 44b formed in the other end are continuous to each other through an intermediate portion 44c.

The large-diameter portion 44a has an opening having a size which allows the portion to be loosely fitted onto the outer peripheral surface of the rear end of the rear housing 18, and, when being compressively caulked in a radial inward direction, the diameter is reduced, so that the portion is fixedly engaged onto the rear housing 18. Then, the large-diameter portion 44a is compressively caulked in a state where the optical fiber cord 70 is inserted from the side of the small-diameter portion 44b of the caulking ring 44, and the tensile strength fibers 74 which are exposed by removing a predetermined length of the outer jacket 72 of the optical fiber cord 70 are placed on the rear housing 18. As a result, the tensile strength fibers 74 are clamped between the rear housing 18 and the caulking ring 44 to be fixed to the rear housing 18.

The small-diameter portion 44b comprises a ring 46 which can be calked on the outer peripheral surface of the small-diameter portion 44b. When the ring 46 is caulked in a radial inward direction, the end portion of the reinforcing tube 42 is clamped between the small-diameter portion 44b of the caulking ring 44 and the ring 46, and the reinforcing tube 42 is fixed. Namely, the caulking ring 44 which functions as a coupling member for the rear housing 18 is integrated with the end portion of the reinforcing tube 42 to from the reinforcing tube assembly 40 which is described later. In the caulked state, the ring 46 is caught by the inner wall end face 21a (see FIG. 5) of the boot 21, thereby restricting the rearward movement of the reinforcing tube 42 toward the rear of the boot 21. The ring 46 corresponds to the locking portion 37a in the previous embodiment.

The reinforcing tube 42 is positioned and fixed on the side of the other end by a thermal shrinkable tube 48 in which a part is placed on the reinforcing tube 42, and another part is placed on an outer jacket 72 of the optical fiber cord 70. Namely, the reinforcing tube 42 is formed so as to have a length which covers a portion of the coated optical fiber 3 that is exposed from the rear of the optical connector 1A by removing a predetermined length of the outer jacket 72 of the optical fiber cord 70, and coupled to the optical connector 1A, so that the tube can cover the coated optical fiber 3 without causing positional displacement.

Next, the assembling procedure in the case where the reinforcing tube is attached will be described.

As shown in FIG. 15(a), first, the components are inserted onto the end portion of the optical fiber cord 70 on the site, in the sequence of the boot 21, a reinforcing tube assembly 40 to which the caulking ring 44 is coupled, and the rear housing 18.

In the reinforcing tube assembly 40, the thermal shrinkable tube 48 is attached to a side end portion of the boot 21 of the reinforcing tube 42, and the caulking ring 44 which functions as a coupling member is previously caulked and fixed to the end portion on the side of the rear housing 18.

Only a portion of the thermal shrinkable tube 48 corresponding to the reinforcing tube 42 thermal-shrinks, and the thermal shrinkable tube 48 is fixed to the reinforcing tube 42. The fixation of the caulking ring 44 is attained by, in a state where the small-diameter portion 44b of the caulking ring 44 is fitted into the end portion of the reinforcing tube 42, compressively caulking the reinforcing tube 42 on the small-diameter portion 44b via the ring 46.

In the optical fiber cord 70 drawn out from the tip end of the rear housing 18, as shown in FIG. 15(b), the outer jacket 72 of the end portion is removed away by a predetermined length, and the tensile strength fibers 74 and the coated optical fiber 3 are exposed. As shown in FIG. 15(c), the exposed tensile strength fibers 74 are folded back toward the reinforcing tube 42 so as not to impede the subsequent work, and the protection sleeve 15 is passed onto the coated optical fiber 3.

In the coated optical fiber 3 drawn out from the protection sleeve 15, as shown in FIG. 15(d), the coating 3a is removed away to expose the naked fiber portion 3b, and then the coated optical fiber is mirror-cut to a predetermined length after the portion 3b is cleaned. As shown in FIG. 15(e), the portion 3b where the coating 3a of the coated optical fiber 3 is peeled off is butted against the portion 5b where the coating of the short optical fiber 5 that is fitted and attached to the plug frame 9 is peeled off, and the butted fiber end faces are fusion-spliced together.

Figure 16:
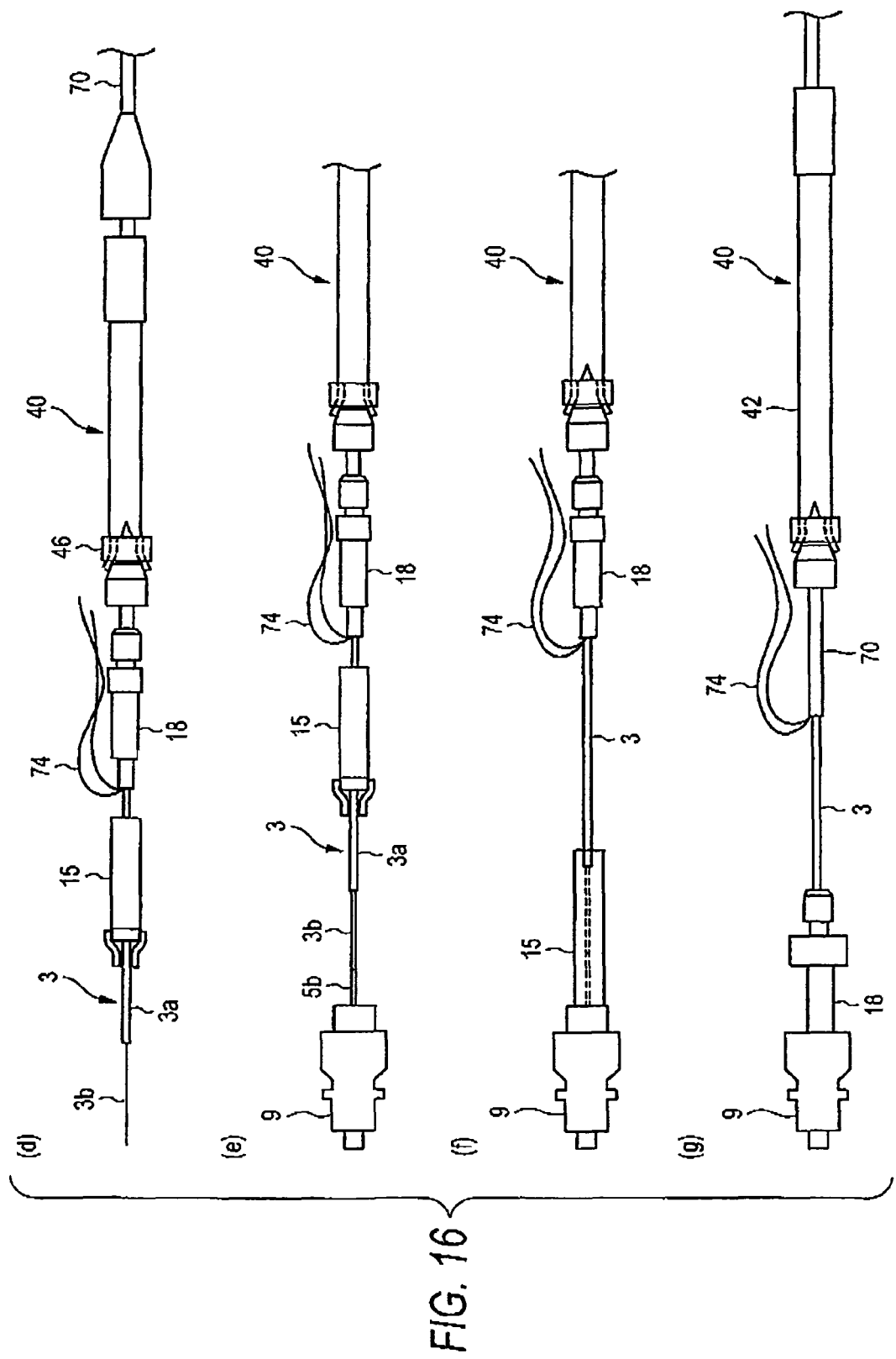
FIGS. 16(d) to 16(g) are step-by-step views illustrating the procedure of assembling the optical connector.

As shown in FIG. 16(f), the protection sleeve 15 is moved so as to cover the fusion spliced portion, and coupled to the plug frame 9 through the optical connector ferrule 7.

As shown in FIG. 16(g), next, the rear housing 18 is moved in a similar manner as the protection sleeve 15, and coupled to and integrated with the plug frame 9 in the state where the rear housing 18 is put on the protection sleeve 15.

Figure 17:
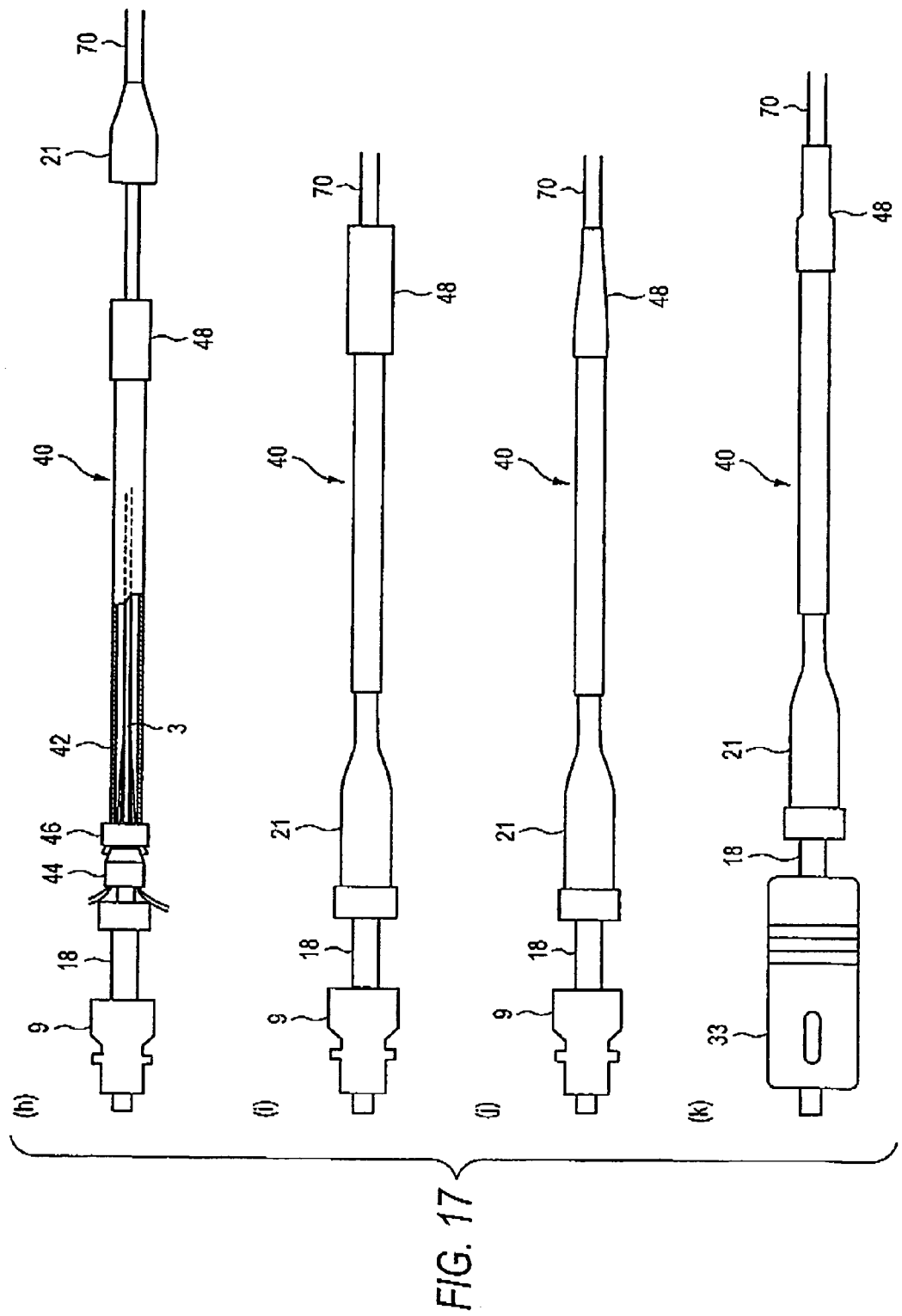
FIGS. 17(*h*) to 17(*k*) are step-by-step views illustrating the procedure of assembling the optical connector.

Successively, in order that the coated optical fiber 3 exposed from the end portion of the optical fiber cord 70 is covered by the reinforcing tube 42, the reinforcing tube assembly 40 is moved to be coupled to the rear housing 18 in the following manner. As shown in FIG. 17(h), first, in the state where the tensile strength fibers 74 are placed on the outer peripheral surface of the rear end of the rear housing 18, the reinforcing tube assembly 40 is moved, and then the tensile strength fibers 74 are caulked and fixed by the large-diameter portion 44a of the caulking ring 44 which functions as a coupling member. This causes the reinforcing tube assembly 40 to be coupled to and integrated with the rear housing 18. As shown in FIG. 17(i), thereafter, the boot 21 is moved on the reinforcing tube assembly 40, and attached to the rear housing 18.

In the other end of the reinforcing tube assembly 40, as shown in FIG. 17(j), the thermal shrinkable tube 48 thermal-shrinks, and the reinforcing tube assembly is positioned and fixed onto the optical fiber cord 70.

As result of the above steps, the one end of the reinforcing tube assembly 40 is positioned by the rear housing 18 and the boot 21, and the other end is positioned by the thermal shrinkable tube 48. Therefore, the movement of the reinforcing tube assembly 40 in the fiber axial direction is restricted, and positional displacement of the portion of the coated optical fiber 3 which is exposed from the rear of the optical connector 1A can be prevented from occurring.

As shown in FIG. 17(k), finally, the SC connector knob 33 is attached to the plug frame 9, thereby completing the assembly process.

According to the above-described embodiment, even when, in order to improve the fusion-splicing work, the outer jacket of the optical fiber cord on the site is largely removed away to expose the coated optical fiber from the optical connector, the exposed coated optical fiber is covered by the reinforcing tube. Even when an external force such as a bending force is applied, therefore, bending which is not larger than an allowable level is blocked, and the optical transmission characteristics can be prevented from being lowered.

Next, a further embodiment of the optical connector of the invention will be described.

Figure 18:
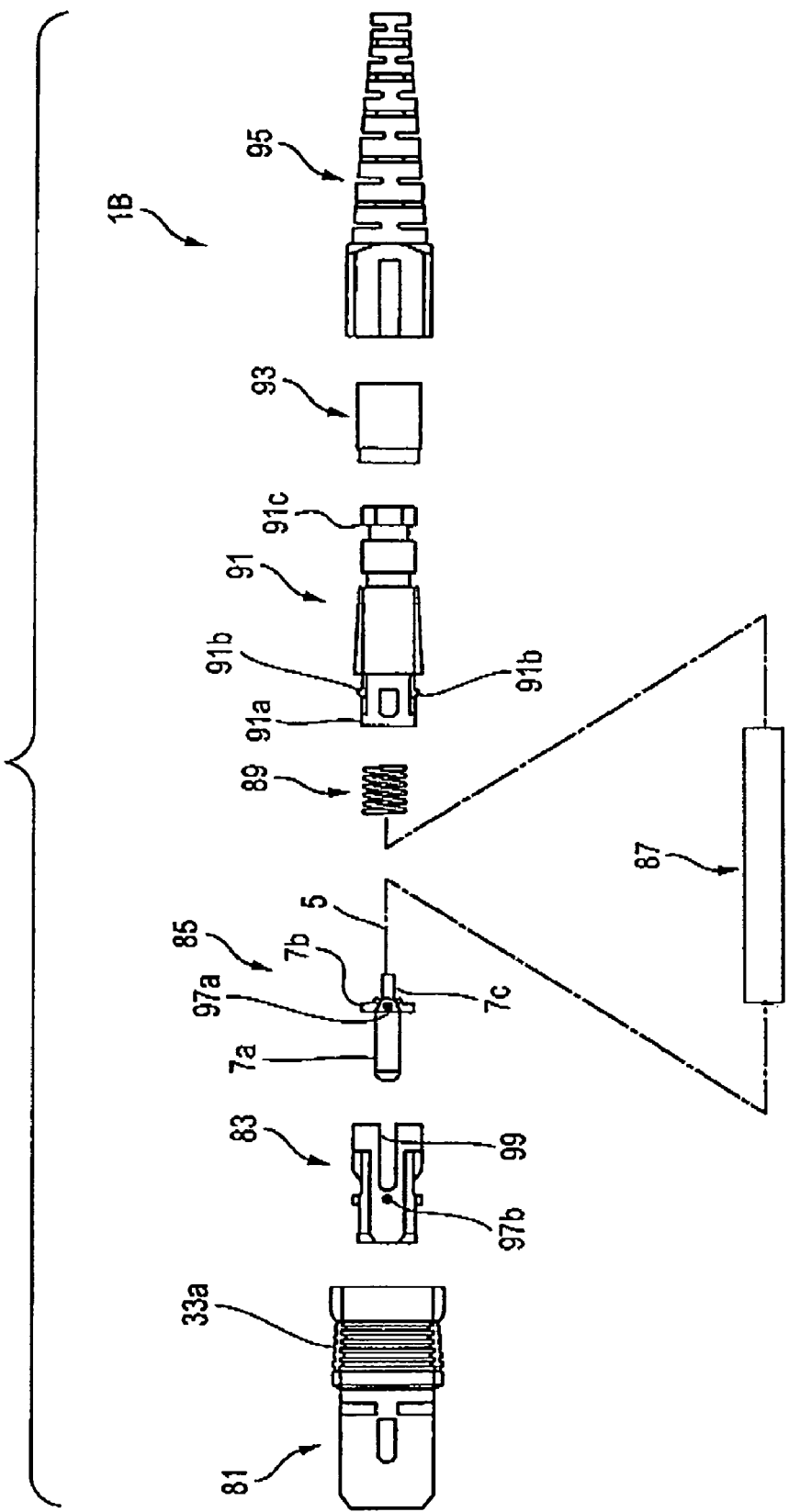
FIG. 18 is a longitudinal section view showing a further embodiment of the optical connector of the invention.

FIG. 18 is a longitudinal section view showing the further embodiment of the optical connector of the invention. The embodiment will be described while components and portions identical with those of the previous embodiments are denoted by the same reference numerals, and their description is omitted.

The optical connector of the embodiment can be applied to both the fiber cord type to which the optical fiber cord 70 is to be connected, and the coated fiber type to which the coated optical fiber 3 is to be connected. In a coated fiber type optical connector, components substantially common with a fiber cord type optical connector are used except that the SC connector knob has a slightly different shape. In the following description, a fiber cord type optical connector (often referred to simply as "optical connector") 1B will be mainly described.

The optical connector 1B has as main members arranged with starting from the tip end side (the left side of FIG. 18) to which a counter optical connector is to be coupled: an SC connector knob 81; a plug frame 83; a fiber-containing ferrule (optical connector ferrule) 85; a protection sleeve 87; a ferrule press spring 89; a rear housing 91; a caulking ring 93; and a boot 95. Namely, the optical connector has a structure where the stopper 11 and coupling component 31 which have been described in the preceding embodiments are not used.

FIG. 19(a) is a longitudinal section view of the optical connector shown in FIG. 18, FIG. 19(b) is a longitudinal section view of main portions of a modification to which a reinforcing tube is attached, FIG. 20(a) is a side view of the optical connector ferrule, and FIG. 20(b) is a front view of the optical connector ferrule, as viewed from the side of a short optical fiber.

The optical connector ferrule 85 has a shape where the diameter-enlarged portion 7b in which the outer diameter is increased is equipped in rear of the tip end shaft portion 7a that is to be butt-connected with a counter optical connector ferrule. The short optical fiber 5 is fitted to the ferrule so that the center axis coincides with the tip end shaft portion 7a. The sleeve coupling protrusion 7c for coupling the protection sleeve 87 which will be described later is protruded from the outer periphery of the basal end side of the optical connector ferrule 85 from which the short optical fiber 5 is extended.

Figure 19:
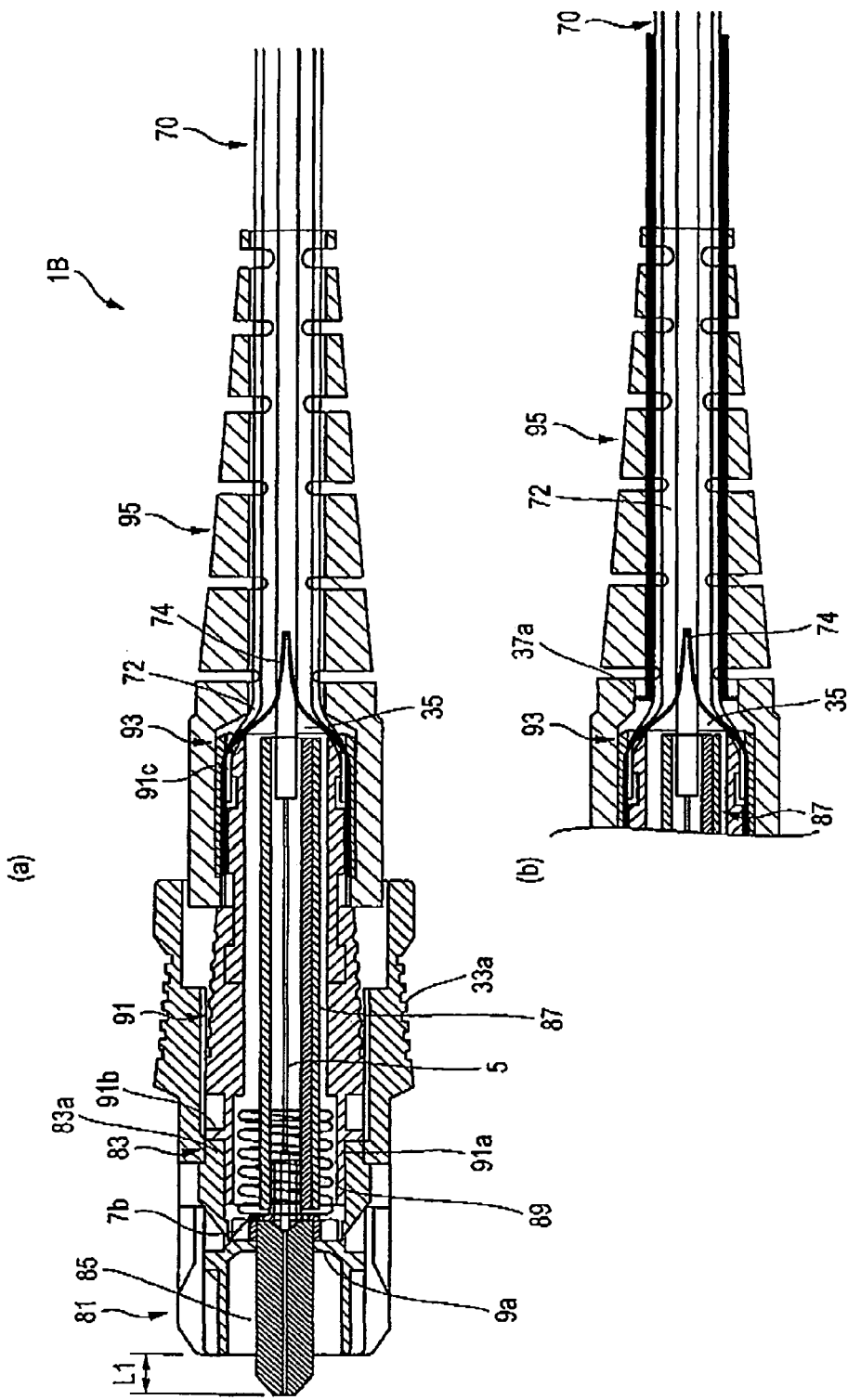
FIG. 19(*a*) is a longitudinal section view of the optical connector shown in FIG. 18, and FIG. 19(*b*) is a longitudinal section view of main portions of a modification to which a reinforcing tube is attached.

When the optical connector ferrule 85 is inserted into the opening on the basal end side of the plug frame 83, as shown in FIG. 19, the front end of the diameter-enlarged portion 7b butts against the diameter-contracted portion 9a which is projected from the inner periphery of the plug frame 83, thereby attaining a state where the forward movement is restricted. In this state, the position restriction is conducted in a state where the tip end of the optical connector ferrule 85 is projected by the predetermined length L1 from the tip end of the plug frame 83.

In order to prevent dust and the like from adhering to the fiber end face during a storage period or the like, a dust cap which is not shown (see the reference numeral 22 in FIG. 2) is put on and attached to the tip end of the optical connector ferrule 85 which is positioned to the plug frame 83.

The tip end face of the optical connector ferrule 85 is previously mirror-polished, so that a polishing process on the site is not necessary.

The ferrule press spring 89 is inserted into the plug frame 83 into which the optical connector ferrule 85 is inserted. The ferrule press spring 89 is a compression coil spring which is clamped and held between the rear housing 91 that will be described later, and that is engaged with the plug frame 83, and the diameter-enlarged portion 7b of the optical connector ferrule 85. The spring causes the diameter-enlarged portion 7b of the optical connector ferrule 85 to butt against the diameter-contracted portion 9a of the plug frame 83, and at the same time elastically supports the ferrule in a retractable manner.

Figure 20:
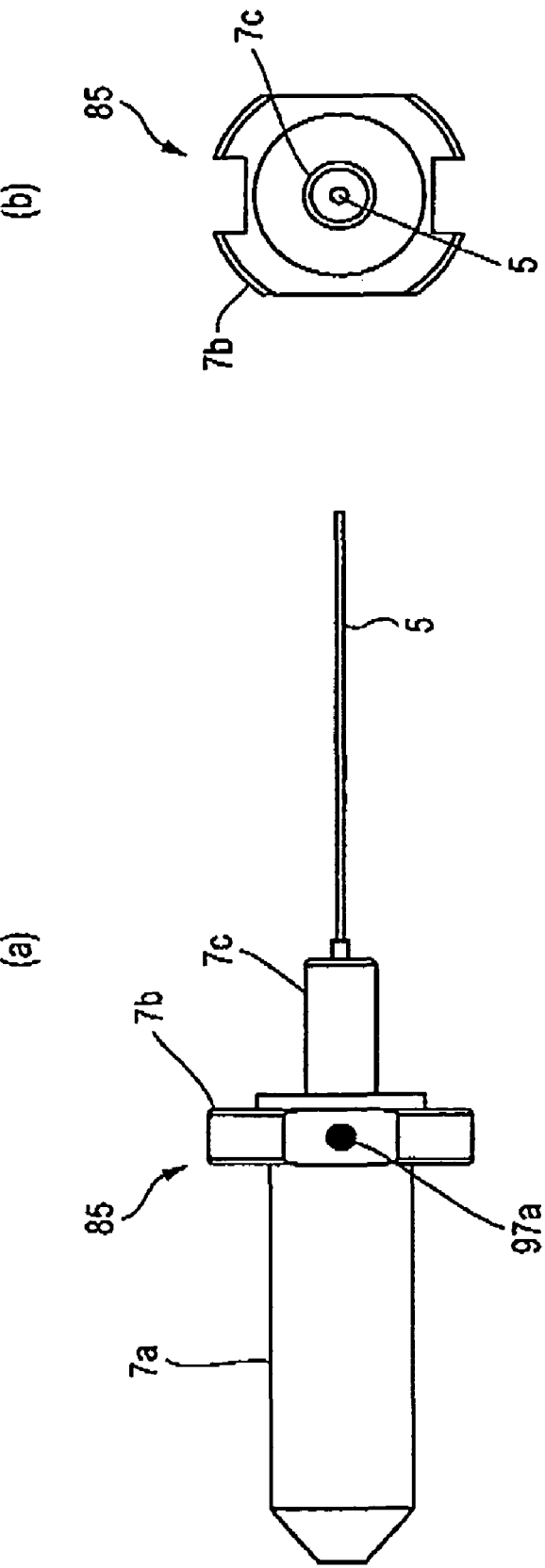
FIG. 20(*a*) is a side view of an optical connector ferrule, and FIG. 20(*b*) is a front view of the optical connector ferrule, as viewed from the side of a short optical fiber.
Figure 21:
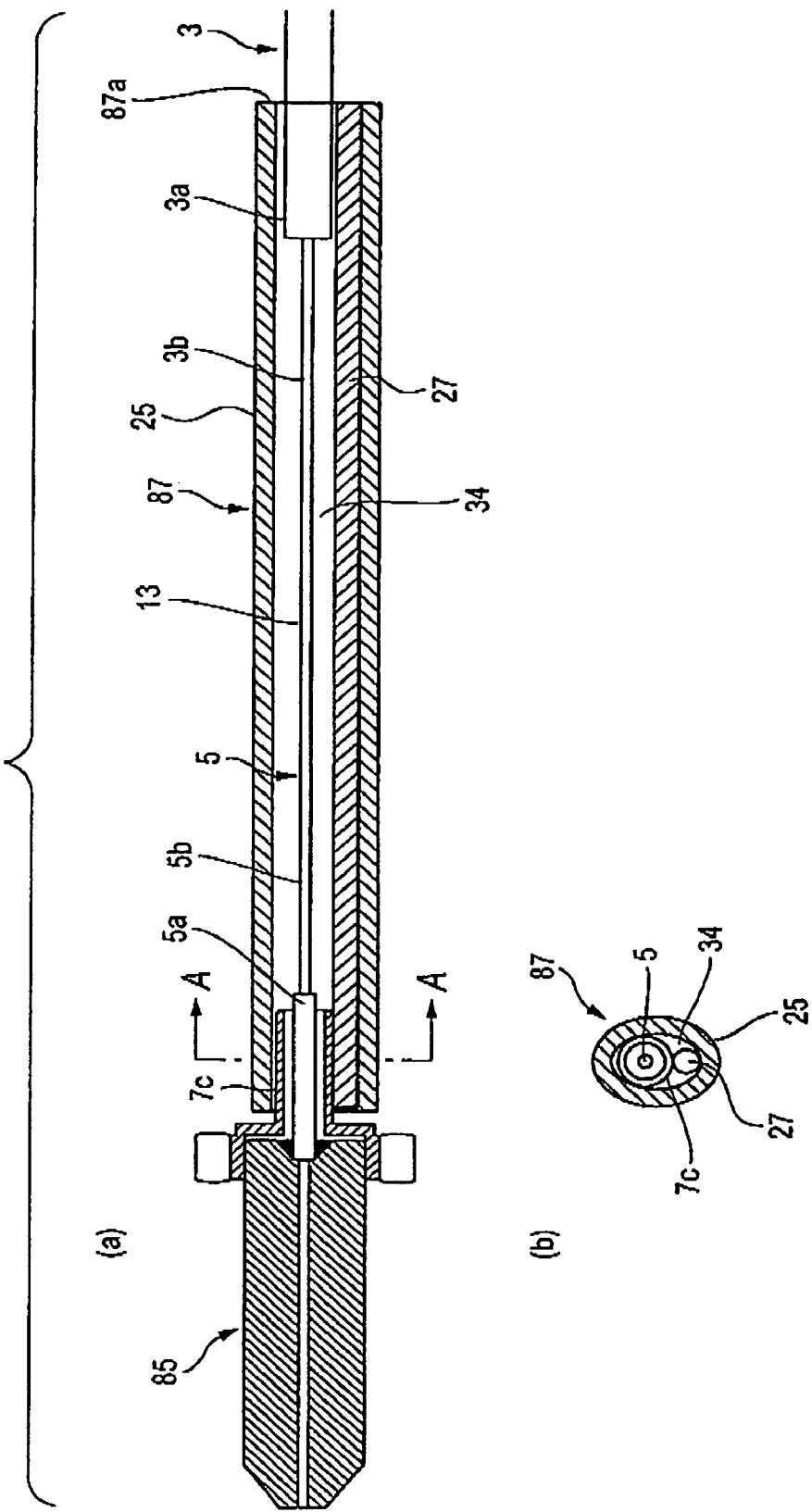
FIG. 21(*a*) is a longitudinal section view of the optical connector ferrule shown in FIG. 20, and FIG. 21(*b*), is a longitudinal section view of a thermal shrinkable tube connected to the optical connector ferrule.

FIG. 21(a) is a longitudinal section view of the optical connector ferrule shown in FIG. 20, and a thermal shrinkable tube connected to the optical connector ferrule, and FIG. 21(b) is a section view of the thermal shrinkable tube in FIG. 21(a), taken along the line A-A.

The fusion spliced portion 13 is formed by: butting the portion 5b where the coating 5a of the end portion of the short optical fiber 5 is peeled off, against the portion 3b where the coating 3a of the end portion of the coated optical fiber 3 is peeled off; and fusion splicing the butted fiber end faces together.

The end face of the short optical fiber 5 where the coating 5a is peeled off is previously mirror-processed by means of cleavage in which bending stress is applied to the optical fiber to cut the fiber, or polishing, so that a mirroring process on the site is not necessary.

Preferably, before the fusion splice, the end face of the short optical fiber 5 is subjected to an electric discharging process to be chamfered, so that chipping from an edge due to polishing can be prevented from occurring. The short optical fiber 5 is transported to the site in the state where the coating is removed away. As the fiber, therefore, a carbon-coated fiber is preferably used because the strength reduction due to damage or water absorption is suppressed. Preferably, the short optical fiber 5 is a fiber in which the MFD is small, and which is highly resistant to bending.

As shown in FIG. 21(b), the protection sleeve 87 comprises the thermal shrinkable tube 25, and the core rod 27 and adhesive tube 29 (see FIG. 10) which are passed through the thermal shrinkable tube 25. The thermal shrinkable tube 25 is coupled to the optical connector ferrule 85. The coated optical fiber 3 is attached into the optical connector 1B in a state where the outer jacket 72 of the end portion of the optical fiber cord 70 is removed away by a predetermined length. The protection sleeve 87 covers the outer periphery of the coated optical fiber 3 in the other end side where the sleeve is not coupled to the optical connector ferrule 85.

When the thermal shrinkable tube 25 is heated to a predetermined temperature by a heating apparatus, the tube thermal-shrinks to attain a state where the tube is closely contacted with the core rod 27 which passes through the tube.

The adhesive tube 29 is softened by the heating for thermal-shrinking the thermal shrinkable tube 25, so as to function as an adhesive agent which fills the gap 34 between the thermal shrinkable tube 25 and the core rod 27.

In the protection sleeve 87, the thermal shrinkable tube 25, the core rod 27, and the adhesive tube 29 are positioned in a state where end portions of the core rod 27 and the adhesive tube 29 coincide with one end of the sleeve, and, in the positioned state, the protection sleeve is fixed to the sleeve coupling protrusion 7c of the optical connector ferrule 85.

The optical connector ferrule 85 is fixed to and integrated with the end portions of the thermal shrinkable tube 25 and the core rod 27 by fixation, adhesion, or welding of the end portions.

The lengths of the short optical fiber 5, the thermal shrinkable tube 25 of the protection sleeve 87, the core rod 27, and the adhesive tube 29 are set so that, when the protection sleeve 87 is coupled to the sleeve coupling protrusion 7c in the basal end of the optical connector ferrule 85, the fusion spliced portion 13 is just positioned at an approximately intermediate position in the longitudinal direction of the protection sleeve 87.

After the fusion splice between the coated optical fiber 3 and the short optical fiber 5, the protection sleeve 87 is moved so as to cover the fusion spliced portion 13, the protection sleeve is butted against the optical connector ferrule 85, and thereafter the thermal shrinkable tube 25 is heated to fix the coated optical fiber 3 and the short optical fiber 5 to the core rod 27 in a vertically adjoining state.

The dimensions of the components are set so that, when the thermal shrinkable tube 25 thermal-shrinks as described above, end portions of the thermal shrinkable tube 25 overlap with the coating 3a of the coated optical fiber 3 and the sleeve coupling protrusion 7c by 2 mm or longer.

The rear housing 91 is a cylindrical structure which covers the periphery of the protection sleeve 87, and formed by injection molding of a resin or the like. The tip end of the rear housing 91 is formed as a cylinder portion 91a which is to be fitted onto the basal end of the plug frame 83. The cylinder portion 91a comprises engaging claws 91b which, when the cylinder portion is fitted onto the basal end of the plug frame 83, are engaged with engaging holes 83a that are opened in the outer periphery of the basal end of the plug frame 83.

After the thermal shrinkage process on the protection sleeve 87, the thus configured rear housing 91 is moved to and put on the protection sleeve 87, and the engaging claws 91b on the tip end side are engaged with the engaging holes 83a of the plug frame 83, whereby the rear housing is coupled to and integrated with the plug frame 83.

The SC connector knob 81 which functions as a knob portion when the connector is connected is put on and attached to the outer periphery of the plug frame 83 to which the rear housing 91 is coupled. The SC connector knob 81 is an outer jacket member which provides the appearance of the tip end side of the optical connector 1B. Anti-slip corrugations 33a for facilitating gripping are formed on the outer side faces.

The boot 95 is used for protecting the optical fiber cord 70 so as to prevent a sharp bend from occurring in the optical fiber cord 70 which rearward extends from the rear housing 91. The tip end of the boot is fitted or screwed to the basal end of the rear housing 91, whereby the boot is coupled to and integrated with the rear housing 91.

Alternatively, the boot may be formed integrally with the rear housing 91 by injection molding of a resin.

The space 35 (see FIG. 19) which allows the protection sleeve 87 to retract is formed between the other end 87a (see FIG. 21) of the protection sleeve 87 and an inner wall end of the boot 95 which is opposed to the other end 87a.

The boot 95 may be configured so that, as shown in FIG. 19(b), the reinforcing tube 37 which is put on the optical fiber cord 70 is inserted and attached in rear of the inner wall end.

In the reinforcing tube 37, the locking portion 37a in which the diameter is increased is disposed at the tip end. The locking portion 37a is engaged with the inner wall end of the boot 95 to restrict the movement. The reinforcing tube 37 is a tube which has an adequate elasticity, and prevents a sharp bend from occurring in the optical fiber cord 70.

A direction alignment mark 97a is disposed on a side face of the diameter-enlarged portion 7b of the optical connector ferrule 85. On the other hand, a direction alignment mark 97b and a checking groove 99 are disposed in a side wall of the plug frame 83. When the direction alignment mark 97a is made coincident with the direction alignment mark 97b while checking the mark 97a through the checking groove 99, the optical connector ferrule 85 is fitted to the plug frame 83 in the normal direction.

In the case where, in the optical connector 1B, the short optical fiber 5 of the optical connector ferrule 85 is to be fusion-spliced with the coated optical fiber 3 which is exposed by removing away the outer jacket 72 of the optical fiber cord 70 on the site, the outer jacket 72 of an end portion of the optical fiber cord 70 is largely peeled off in order to improve the fusion-splicing work. When the outer jacket 72 of the optical fiber cord 70 is peeled (removed) in an end portion, the coated optical fiber 3 in which the outer periphery is covered with tensile strength fibers (Kevlar) 74 is exposed.

The tensile strength fibers 74 and the outer jacket 72 are cut to a predetermined length, and then fitted onto a rear end portion 91c of the rear housing 91. The caulking ring 93 is put on the outer periphery of the fitted outer jacket 72, and caulked in the direction along which the diameter is reduced. When the diameter of the caulking ring 93 is reduced, the outer jacket 72 and the tensile strength fibers 74 are press bonded to the caulking ring 93 and the rear end portion 91c to be fixed to the rear housing 91.

Figure 22:
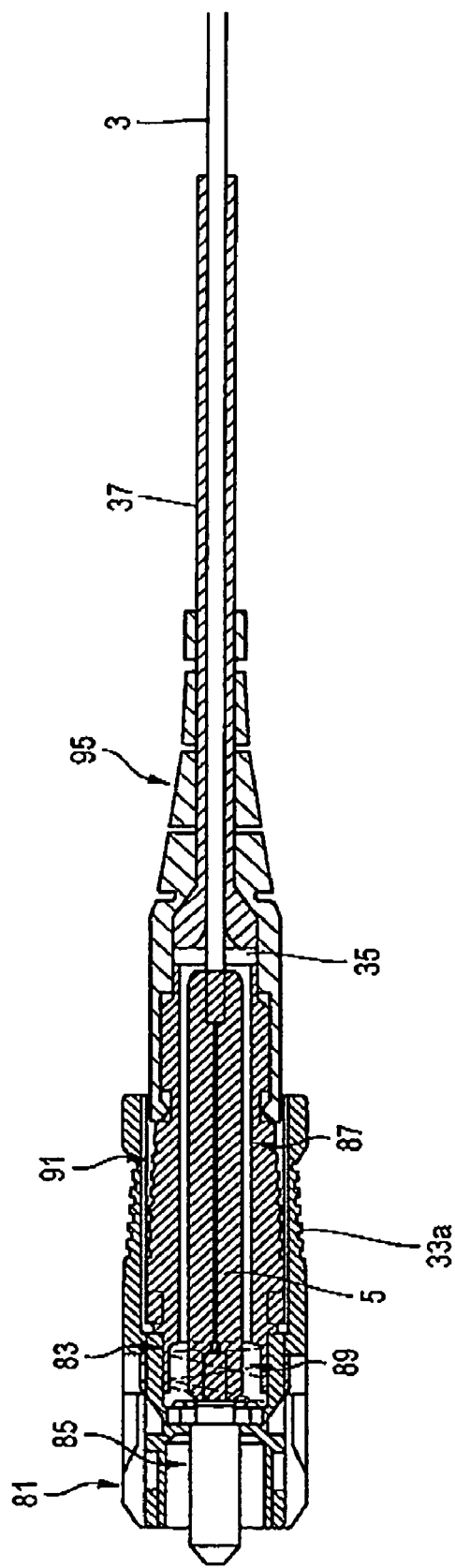
FIG. 22 is a longitudinal section view showing the configuration of a modification in which the optical connector shown in FIG. 18 is applied to a coated fiber type.

FIG. 22 is a longitudinal section view showing the configuration of a modification in which the optical connector shown in FIG. 18 is applied to a coated fiber type.

As described above, the optical connector 1B of the embodiment can be used also as a coated fiber type. In this case, the component configuration is identical with that of the fiber cord type except that the SC connector knob 81 has a slightly different shape, and that the caulking ring 93 for fixing the tensile strength fibers 74 and the outer jacket 72 is not necessary. In FIG. 22, 37 denotes a reinforcing tube for the coated optical fiber 3.

In the above-described optical connector 1B, the one end of the protection sleeve 87 is coupled to the optical connector ferrule 85, and hence the protection sleeve 87 is accurately positioned irrespective of the skill level of the worker. As a result, the overlap length between the end portion of the protection sleeve 87 and the covered portion of the coated optical fiber 3 can be shortened to about 3 mm. Therefore, the length of the protection sleeve 87 can be largely shortened, and that of the optical connector 1B can be compactified.

Because of the compactification of the optical connector 1B, therefore, the housing property into a small aerial closure or the like can be enhanced.

Moreover, the protection sleeve 87 which covers the short optical fiber 5 previously fitted to the optical connector ferrule 85 and the periphery of the fusion spliced portion 13 is coupled to the optical connector ferrule 85. When, in connection of the connector, the optical connector ferrule 85 is retracted by butting of the counter optical connector ferrule, also the protection sleeve 87 is retracted integrally with the optical connector ferrule 85. Therefore, a large compressive load does not act on the short optical fiber 5.

In a work of connecting the connector, consequently, it is possible to prevent a large bending load from acting on the short optical fiber 5 fitted to the optical connector ferrule 85, thereby solving the problems of the increase of the bending loss of an optical fiber, the breakage, and the like.

In the optical connector 1B of the embodiment, the protection sleeve 87 comprises: the thermal shrinkable tube 25; and the core rod 27 and adhesive tube 29 which are passed through the thermal shrinkable tube 25, and the protection sleeve 87 is coupled to the optical connector ferrule 85.

In the protection sleeve 87, by the simple operation in which, after the one end of the protection sleeve is coupled to the sleeve coupling protrusion 7c of the optical connector ferrule 85, the thermal shrinkable tube 25 in the outer periphery of the sleeve is caused to thermal-shrink by the heating process using a heating apparatus, the fusion spliced portion 13 between the short optical fiber 5 and the coated optical fiber 3 on the site can be firmly held to the state where they vertically adjoin the core rod 27. Therefore, the fusion spliced portion 13 can be rigidly reinforced.

Even in a site where a working facility and the like are hardly prepared, therefore, the fusion spliced portion 13 can be protected easily and surely by the protection sleeve 87.

Next, the procedure of assembling the thus configured optical connector 1B will be described.

FIGS. 23(a) to 23(e) are step-by-step views illustrating the procedure of assembling the optical connector shown in FIG. 18, FIGS. 24(f) to 24(k) are step-by-step views illustrating the procedure of assembling the optical connector shown in FIG. 18, and FIGS. 25(l) to 25(q) are step-by-step views illustrating the procedure of assembling the optical connector shown in FIG. 18.

Figure 23:
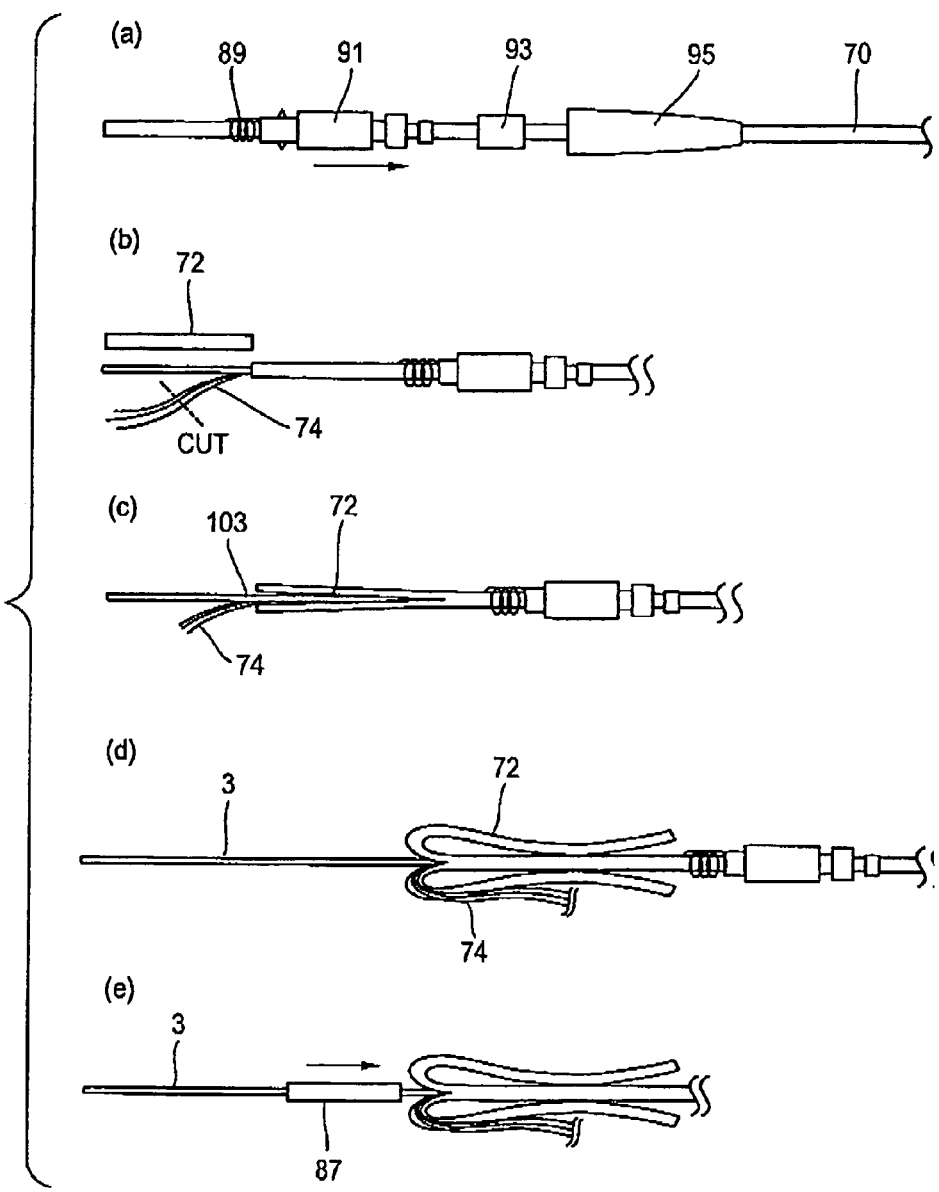
FIGS. 23(*a*) to 23(*e*) are step-by-step views illustrating a procedure of assembling the optical connector shown in FIG. 18.

When the optical connector 1B is to be assembled, as shown in FIG. 23(a), first, the components are inserted onto the end portion of the optical fiber cord 70 on the site, in the sequence of the boot 95, the caulking ring 93, the rear housing 91, and the ferrule press spring 89.

As shown in FIG. 23(b), the outer jacket 72 on the tip end side of the optical fiber cord 70 is removed away, and extra portions of the tensile strength fibers 74 are cut away. As shown in FIG. 23(c), an axial incision 103 is formed in the outer jacket 72, and the outer jacket is then torn. As shown in FIG. 23(d), the outer jacket 72 and the exposed tensile strength fibers 74 are folded back so as not to impede the subsequent work, and the protection sleeve 87 is passed onto the coated optical fiber 3 as shown in FIG. 23(e).

Figure 24:
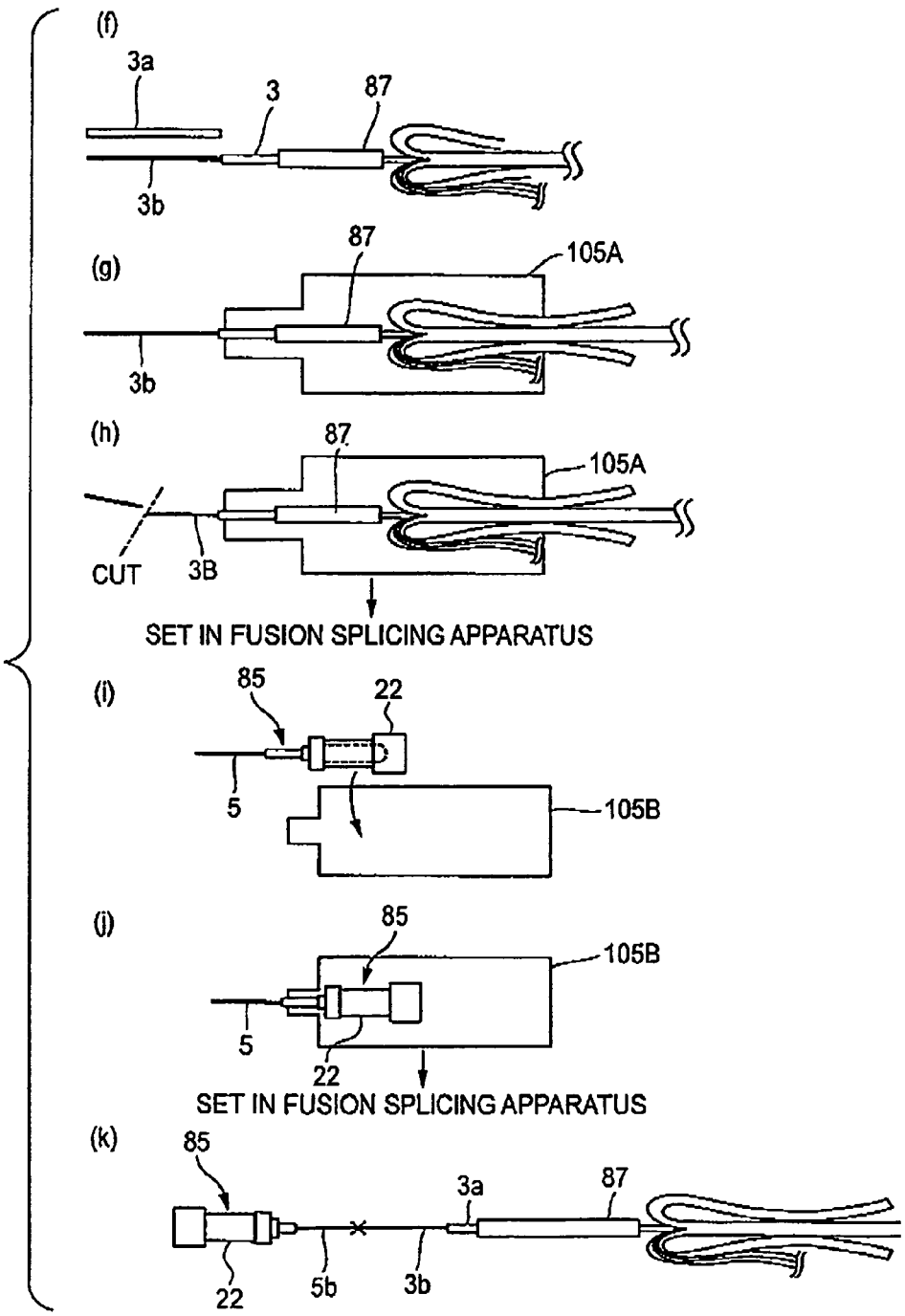
FIGS. 24(*f*) to 24(*k*) are step-by-step views illustrating the procedure of assembling the optical connector shown in FIG. 18.

In the coated optical fiber 3 drawn out from the protection sleeve 87, as shown in FIG. 24(f), the coating 3a is removed away to expose the naked fiber portion 3b, and then the portion 3b is cleaned. As shown in FIG. 24(g), the protection sleeve 87 and the coated optical fiber 3 are set to a fusion fiber holder 105A. As shown in FIG. 24(h), the coated optical fiber is mirror-cut to a predetermined length, and then the protection sleeve 87 and the coated optical fiber 3 are set to a fusion splicing apparatus which is not shown.

By contrast, as shown in FIG. 24(i), the optical connector ferrule 85 incorporating the short optical fiber 5 is set to a ferrule holder 105B. In the figure, 22 denotes a dust cap. As shown in FIG. 24(j), the ferrule holder 105B holding the optical connector ferrule 85 is set to the fusion splicing apparatus which is not shown. In the fusion splicing apparatus, as shown in FIG. 24(k), the portion 3b where the coating 3a of the coated optical fiber 3 is peeled off is butted against the portion 5b where the coating of the short optical fiber 5 of the optical connector ferrule 85 is peeled off, to be fusion spliced together.

Figure 25:
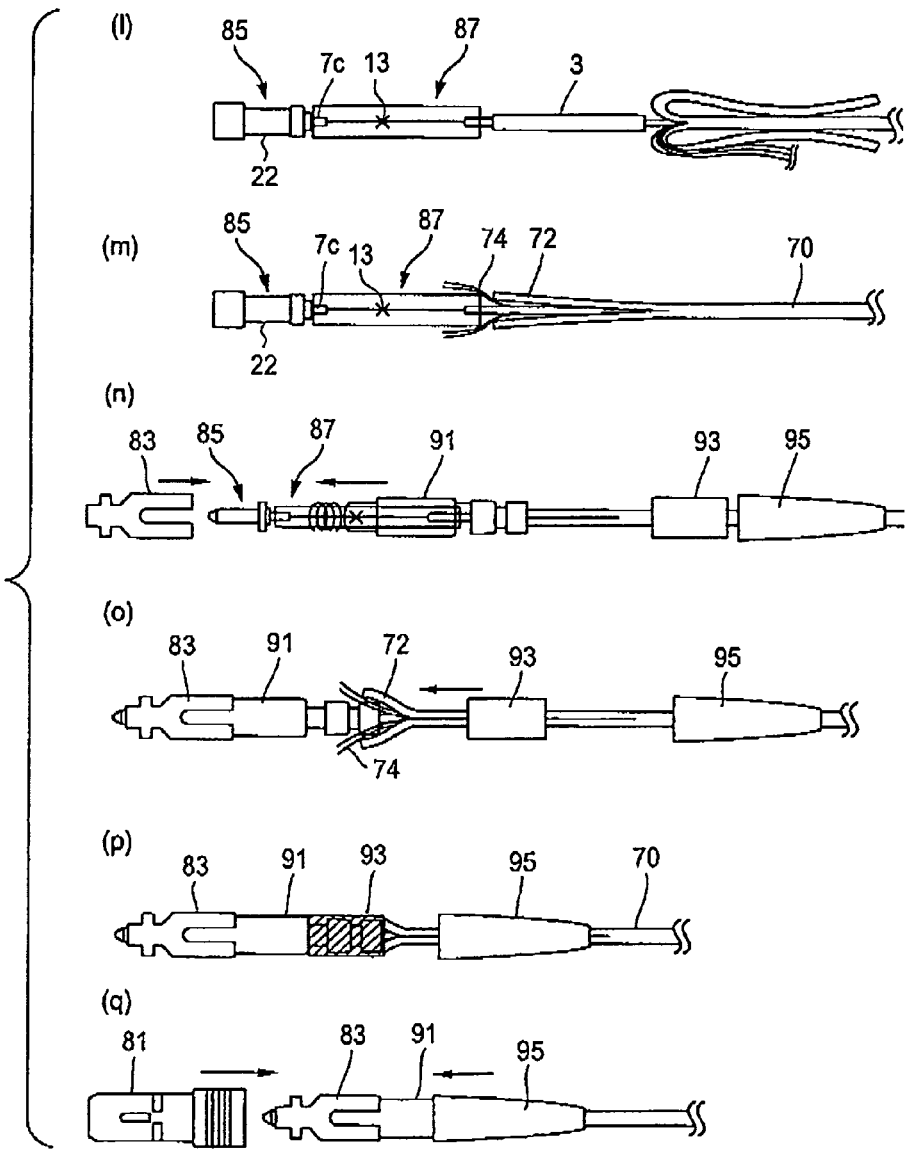
FIGS. 25(*l*) to 25(*q*) are step-by-step views illustrating the procedure of assembling the optical connector shown in FIG. 18.
Figure 26:
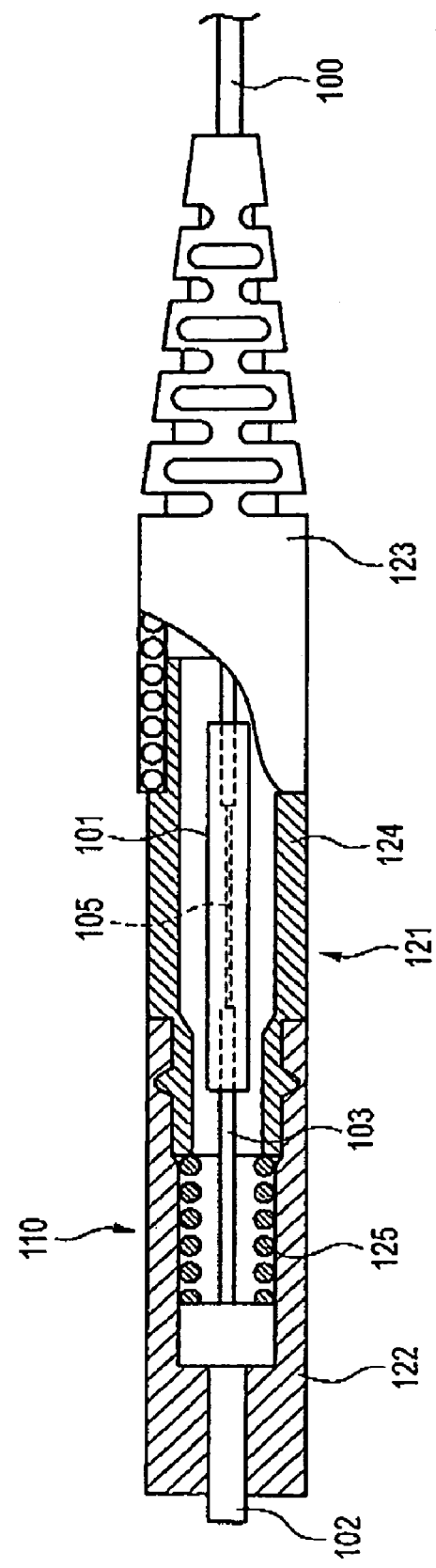
FIG. 26 is a diagram of a structure for fusion-splicing a short optical fiber which is previously fitted to a conventional optical connector ferrule, with a coated optical fiber.
Figure 27:
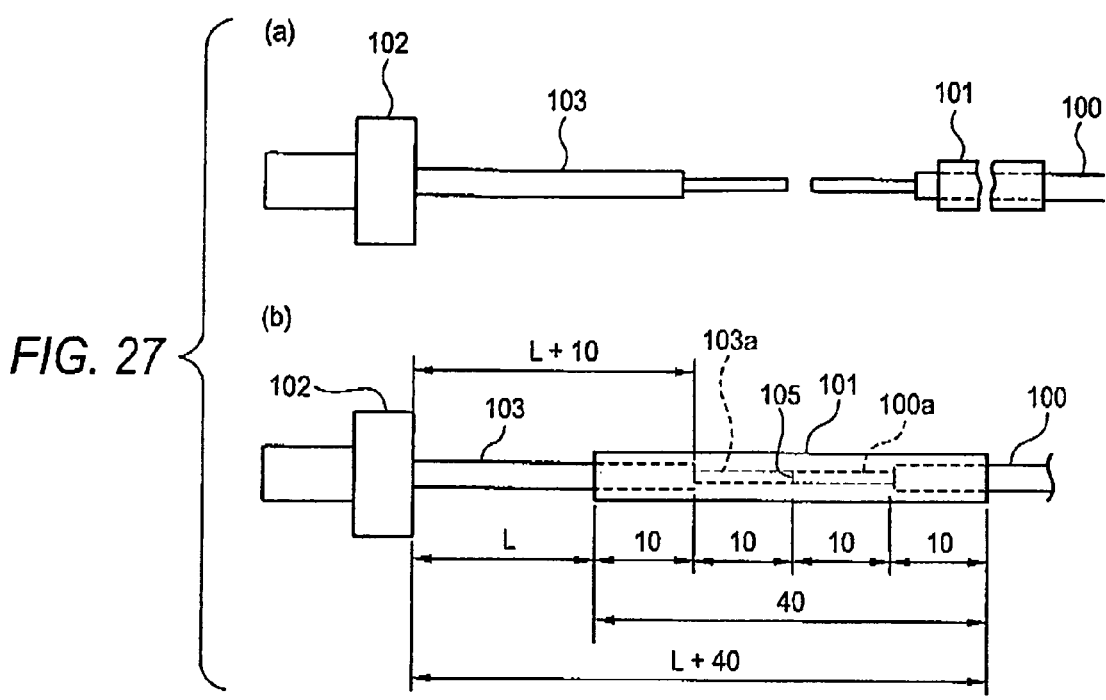
FIG. 27 is a diagram of a conventional optical connector.

As shown in FIG. 25(l), the tip end of the protection sleeve 87 is inserted onto the sleeve coupling protrusion 7c of the optical connector ferrule 85, the fusion spliced portion 13 is covered, and the protection sleeve 87 is caused to thermal-shrink. As shown in FIG. 25(m), the tensile strength fibers 74 and outer jacket 72 which are folded back are returned to their original states.

As shown in FIG. 25(n), the dust cap 22 is detached from the optical connector ferrule 85, the tip end of the optical connector ferrule 85 is inserted into the plug frame 83, and the rear housing 91 is installed on the plug frame 83 while housing the ferrule press spring 89 into the housing. As shown in FIG. 25(o), the tensile strength fibers 74 and the outer jacket 72 are put on the rear end portion 91c of the rear housing 91.

As shown in FIG. 25(p), the caulking ring 93 is press bonded to fix the tensile strength fibers 74 and the outer jacket 72 to the rear end portion 91c. Finally, the SC connector knob 81 and the boot 95 are coupled to the plug frame 83 and the rear housing 91, respectively, thereby completing the process of assembling the optical connector 1B.

Although the invention has been described in detail and with reference to the specific embodiment, it is obvious to those skilled in the art that various modifications and variations are possible without departing the spirit and scope of the invention.

The application is based on Japanese Patent Application (No. 2006-307138) filed Nov. 13, 2006 and Japanese Patent Application (No. 2007-006251) filed Jan. 15, 2007, and their disclosures are incorporated herein by reference.

INDUSTRIAL APPLICABILITY

Since one end of the protection sleeve is coupled to the optical connector ferrule, the protection sleeve which is used for setting the fusion spliced portion to the middle position is accurately positioned irrespective of the skill level of the worker.

In the protection sleeve, in a work of connecting the connector, moreover, it is possible to prevent a large bending load from acting on the short optical fiber fitted to the optical connector ferrule, thereby solving problems of the increase of the bending loss of an optical fiber, the breakage, and the like.

In the coated optical fiber, even when, in order to improve a fusion-splicing work to be performed on the site, the outer jacket of the optical fiber cord is largely removed away to expose the coated optical fiber from the optical connector, the coverage by the reinforcing tube can prevent the increase of the bend loss of the optical fiber, and the like from occurring.

The invention claimed is:

1. An optical connector which houses and holds a fusion spliced portion where a short optical fiber fitted to an optical connector ferrule is fusion-spliced with a coated optical fiber, wherein:
one end of a protection sleeve which reinforces said fusion spliced portion is coupled to said optical connector ferrule, and
said protection sleeve comprises:
a thermal shrinkable tube; a core rod and an adhesive tube which are passed through said thermal shrinkable tube, and said protection sleeve is coupled to said optical connector ferrule.

2. An optical connector according to claim 1, wherein:
said coated optical fiber is attached into said optical connector in a state where an outer jacket of an end portion of an optical fiber cord is removed away by a predetermined length, and
said protection sleeve covers an outer periphery of the coated optical fiber on another side where said protection sleeve is not coupled to said optical connector ferrule.

3. An optical connector according to claim 2 wherein said optical connector further comprises: a plug frame which allows a tip end of said optical connector ferrule to be projected, and which houses said ferrule.

4. An optical connector according to claim 3, wherein said optical connector further comprises:
a rear housing which allows said protection sleeve to be placed in an internal space and is connected with said plug frame, and
said rear housing comprises an engaging claw with which an engaging hole that is opened in said plug frame is engaged.

5. An optical connector according to claim 4, wherein tensile strength fibers disposed in said optical fiber cord are caulked and fixed to a rear end portion of said rear housing.

6. An optical connector according to claim 1, wherein said optical connector further comprises:
a plug frame which allows a tip end portion of said optical connector ferrule to be projected, and which houses said ferrule, and an guide groove which guides a positioning protrusion to be movable in a fiber axial direction is formed in said plug frame, said positioning protrusion projecting from an outer peripheral surface of said protection sleeve.

7. An optical connector according to claim 6, wherein said optical connector further comprises:
a rear housing which allows said protection sleeve to be placed in an internal space and is connected with said plug frame, and in which a boot that protects said coated optical fiber is integrally formed, and said rear housing comprises an engaging hole with which an engaging claw that is projected from said plug frame is engaged.

8. An optical connector according to claim 7, wherein a space is formed between another end of said protection sleeve and an inner end wall of said rear housing.

9. An optical connector according to claim 7, wherein said coated optical fiber is attached into said optical connector in a state where an outer jacket of an end portion of an optical fiber cord is removed away by a predetermined length, and a reinforcing tube which covers said coated optical fiber is coupled to a rear end of said rear housing.

10. An optical connector according to claim 9, wherein said reinforcing tube is coupled to said rear end of said rear housing via a coupling member, and said coupling member caulks and fixes tensile strength fibers disposed in said optical fiber cord.

11. An optical connector according to claim 1, wherein positions of said short optical fiber placed in said protection sleeve, and said coated optical fiber coincide with an axial center of said optical connector ferrule.

12. An optical connector which houses and holds a fusion spliced portion where a short optical fiber fitted to an optical connector ferrule is fusion-spliced with a coated optical fiber, with the coated optical fiber being part of an optical fiber cord, wherein: one end of a protection sleeve which reinforces said fusion spliced portion is coupled to said optical connector ferrule, said optical connector comprises: a plug frame which allows a tip end portion of said optical connector ferrule to be projected, and which houses said ferrule, and a rear housing which allows said protection sleeve to be placed in an internal space and is connected with said plug frame, and said rear housing comprises: an engaging claw with which an engaging hole that is opened in said plug frame is engaged, and wherein tensile strength fibers disposed in said optical fiber cord are caulked and fixed to a rear end portion of said rear housing.

13. An optical connector according to claim 12, wherein:
said coated optical fiber is attached into said optical connector in a state where an outer jacket of an end portion of an optical fiber cord is removed away by a predetermined length, and said protection sleeve covers an outer periphery of the coated optical fiber on another side where said protection sleeve is not coupled to said optical connector ferrule.

14. An optical connector according to claim 12, wherein said optical connector further comprises:
a plug frame which allows a tip end portion of said optical connector ferrule to be projected, and which houses said ferrule, and an guide groove which guides a positioning protrusion to be movable in a fiber axial direction is formed in said plug frame, said positioning protrusion projecting from an outer peripheral surface of said protection sleeve.

15. An optical connector according to claim 14, wherein said optical connector further comprises:
a rear housing which allows said protection sleeve to be placed in an internal space and is connected with said plug frame, and in which a boot that protects said coated optical fiber is integrally formed, and said rear housing comprises an engaging hole with which an engaging claw that is projected from said plug frame is engaged.

16. An optical connector according to claim 15, wherein a space is formed between another end of said protection sleeve and an inner end wall of said rear housing.

17. An optical connector according to claim 15, wherein said coated optical fiber is attached into said optical connector in a state where an outer jacket of an end portion of an optical fiber cord is removed away by a predetermined length, and a reinforcing tube which covers said coated optical fiber is coupled to a rear end of said rear housing.

18. An optical connector according to claim 17, wherein said reinforcing tube is coupled to said rear end of said rear housing via a coupling member, and said coupling member caulks and fixes tensile strength fibers disposed in said optical fiber cord.

19. An optical connector according to claim 12, wherein positions of said short optical fiber placed in said protection sleeve, and said coated optical fiber coincide with an axial center of said optical connector ferrule.

20. An optical connector which houses and holds a fusion spliced portion where a short optical fiber fitted to an optical connector ferrule is fusion-spliced with a coated optical fiber, wherein:
one end of a protection sleeve which reinforces said fusion spliced portion is coupled to said optical connector ferrule, and
said protection sleeve comprises:
a thermal shrinkable tube; a core rod and adhesive tube which are passed through said thermal shrinkable tube; and a coupling component which is secured to one end of said thermal shrinkable tube, and said coupling component is coupled to said optical connector ferrule.

21. An optical connector according to claim 20, wherein:
said coated optical fiber is attached into said optical connector in a state where an outer jacket of an end portion of an optical fiber cord is removed away by a predetermined length, and
said protection sleeve covers an outer periphery of the coated optical fiber on another side where said protection sleeve is not coupled to said optical connector ferrule.

22. An optical connector according to claim 20, wherein said optical connector further comprises:
a plug frame which allows a tip end portion of said optical connector ferrule to be projected, and which houses said ferrule.

23. An optical connector according to claim 22, wherein said optical connector further comprises:
a rear housing which allows said protection sleeve to be placed in an internal space and is connected with said plug frame, and
said rear housing comprises an engaging claw with which an engaging hole that is opened in said plug frame is engaged.

24. An optical connector according to claim 23, wherein tensile strength fibers disposed in said optical fiber cord are caulked and fixed to a rear end portion of said rear housing.

25. An optical connector according to claim 20, wherein said core rod is fixed to said coupling component.

26. An optical connector according to claim 20, wherein said optical connector further comprises:
a plug frame which allows a tip end portion of said optical connector ferrule to be projected, and which houses said ferrule, and an guide groove which guides a positioning protrusion to be movable in a fiber axial direction is formed in said plug frame, said positioning protrusion projecting from an outer peripheral surface of said protection sleeve.

27. An optical connector according to claim 26, wherein said optical connector further comprises:
a rear housing which allows said protection sleeve to be placed in an internal space and is connected with said plug frame, and in which a boot that protects said coated optical fiber is integrally formed, and said rear housing comprises an engaging hole with which an engaging claw that is projected from said plug frame is engaged.

28. An optical connector according to claim 27, wherein a space is formed between another end of said protection sleeve and an inner end wall of said rear housing.

29. An optical connector according to claim 27, wherein said coated optical fiber is attached into said optical connector in a state where an outer jacket of an end portion of an optical fiber cord is removed away by a predetermined length, and a reinforcing tube which covers said coated optical fiber is coupled to a rear end of said rear housing.

30. An optical connector according to claim 29, wherein said reinforcing tube is coupled to said rear end of said rear housing via a coupling member, and said coupling member caulks and fixes tensile strength fibers disposed in said optical fiber cord.

31. An optical connector according to claim 20, wherein positions of said short optical fiber placed in said protection sleeve, and said coated optical fiber coincide with an axial center of said optical connector ferrule.

32. An optical connector which houses and holds a fusion spliced portion where a short optical fiber fitted to an optical connector ferrule is fusion-spliced with a coated optical fiber, wherein:
one end of a protection sleeve which reinforces said fusion spliced portion is coupled to said optical connector ferrule, and
said optical connector further comprises:
a plug frame which allows a tip end portion of said optical connector ferrule to be projected, and which houses said ferrule, and an guide groove which guides a positioning protrusion to be movable in a fiber axial direction is formed in said plug frame, said positioning protrusion projecting from an outer peripheral surface of said protection sleeve.

33. An optical connector according to claim 32, wherein:

said coated optical fiber is attached into said optical connector in a state where an outer jacket of an end portion of an optical fiber cord is removed away by a predetermined length, and said protection sleeve covers an outer periphery of the coated optical fiber on another side where said protection sleeve is not coupled to said optical connector ferrule.

34. An optical connector according to claim 32, wherein said optical connector further comprises:

a rear housing which allows said protection sleeve to be placed in an internal space and is connected with said plug frame, and in which a boot that protects said coated optical fiber is integrally formed, and said rear housing comprises an engaging hole with which an engaging claw that is projected from said plug frame is engaged.

35. An optical connector according to claim 34, wherein a space is formed between another end of said protection sleeve and an inner end wall of said rear housing.

36. An optical connector according to claim 34, wherein said coated optical fiber is attached into said optical connector in a state where an outer jacket of an end portion of an optical fiber cord is removed away by a predetermined length, and a reinforcing tube which covers said coated optical fiber is coupled to a rear end of said rear housing.

37. An optical connector according to claim 36, wherein said reinforcing tube is coupled to said rear end of said rear housing via a coupling member, and said coupling member caulks and fixes tensile strength fibers disposed in said optical fiber cord.

38. An optical connector according to claim 32, wherein positions of said short optical fiber placed in said protection sleeve, and said coated optical fiber coincide with an axial center of said optical connector ferrule.

* * * * *